US011479180B2

(12) United States Patent
Jayakumar et al.

(10) Patent No.: US 11,479,180 B2
(45) Date of Patent: Oct. 25, 2022

(54) EXPANDABLE CARGO BOX ASSEMBLY FOR A PICKUP TRUCK

(71) Applicant: ABC TECHNOLOGIES INC., Toronto (CA)

(72) Inventors: Avinash Jayakumar, Mississauga (CA); Harman Gill, Brampton (CA); Usman Dulatov, Newmarket (CA); Dave Flajnik, Rochester Hills, MI (US)

(73) Assignee: ABC TECHNOLOGIES INC., Toronto (CA)

( * ) Notice: Subject to any disclaimer, the term of this patent is extended or adjusted under 35 U.S.C. 154(b) by 349 days.

(21) Appl. No.: 16/739,468

(22) Filed: Jan. 10, 2020

(65) Prior Publication Data

US 2020/0223370 A1 Jul. 16, 2020

Related U.S. Application Data

(60) Provisional application No. 62/791,229, filed on Jan. 11, 2019.

(51) Int. Cl.
*B60R 9/02* (2006.01)
*B60R 11/00* (2006.01)

(52) U.S. Cl.
CPC .......... *B60R 9/02* (2013.01); *B60R 2011/004* (2013.01); *B60R 2011/0052* (2013.01); *B60R 2011/0075* (2013.01); *B60R 2011/0082* (2013.01); *B60R 2011/0094* (2013.01)

(58) Field of Classification Search
CPC B60R 5/04; B60R 5/041; B60R 5/042; B60R 5/02; B60R 9/02; B60R 9/06; B60R 9/065; B60R 2011/004; B60R 2011/0052; B60R 2011/0075; B60R 2011/0082; B60R 2011/0094; B60R 11/06
USPC ........ 296/37.5, 37.6; 224/549, 497–499, 404
See application file for complete search history.

(56) References Cited

U.S. PATENT DOCUMENTS

| | | | |
|---|---|---|---|
| 1,016,523 A | * | 2/1912 | Rinner ..................... B65D 9/14 217/14 |
| 1,179,445 A | | 4/1916 | Manning |
| 1,822,585 A | | 9/1931 | Douglas et al. |
| 1,972,483 A | | 9/1934 | Hartson |
| 2,573,089 A | | 10/1951 | Armenia |
| 3,746,203 A | | 7/1973 | Cipolla |
| 4,469,364 A | | 9/1984 | Rafi-Zadeh |

(Continued)

*Primary Examiner* — Gregory A Blankenship
(74) *Attorney, Agent, or Firm* — Medler Ferro Woodhouse & Mills PLLC

(57) ABSTRACT

An expandable cargo box assembly for mounting on a side wall section of a cargo bed of a pickup truck includes a base member for attaching the expandable cargo box assembly to the side wall section of the cargo bed, the base member having the form of an outer wall plate. Opposite the outer wall plate is an inner wall plate, the inner wall plate being displaceable from a first position to a second position, the first position defining a collapsed state, and the second position defining a deployed state. The outer and inner wall plates have operably associated therebetween a folding floor assembly, and the outer wall plate supports a forward folding wall and a rearward folding wall. Upon expanding the expandable cargo box assembly to a deployed state, the folding floor assembly and the forward and rearward folding walls are arranged to define an enclosure for receiving cargo.

20 Claims, 22 Drawing Sheets

(56) References Cited

U.S. PATENT DOCUMENTS

| | | | | |
|---|---|---|---|---|
| 5,299,704 A * | 4/1994 | Thorby | ............... | B65D 7/26 224/404 |
| 5,340,183 A * | 8/1994 | Horian | ............... | B60R 7/02 224/403 |
| 5,535,931 A * | 7/1996 | Barlow | ............... | B60R 7/02 224/543 |
| 6,007,129 A * | 12/1999 | Kearney, Jr. | ............... | B60R 11/06 224/404 |
| 6,053,553 A * | 4/2000 | Hespelt | ............... | B60R 7/02 296/37.6 |
| 6,254,162 B1 * | 7/2001 | Faber | ............... | B60R 5/04 224/539 |
| 6,276,582 B1 * | 8/2001 | Alexander | ............... | B60R 7/043 220/6 |
| 6,454,148 B1 * | 9/2002 | Cook | ............... | B60R 9/00 410/121 |
| 6,507,701 B2 | 1/2003 | Lake | | |
| 6,536,826 B1 * | 3/2003 | Reed | ............... | B60P 3/42 224/404 |
| 6,644,710 B2 * | 11/2003 | Seel | ............... | B60R 7/02 296/37.16 |
| 6,848,732 B2 * | 2/2005 | Green | ............... | B60P 3/03 296/24.33 |
| 7,036,861 B2 | 5/2006 | Steffens et al. | | |
| 7,182,177 B1 * | 2/2007 | Simnacher | ............... | B66F 3/12 224/404 |
| 7,488,021 B1 * | 2/2009 | Roos | ............... | B60P 3/40 296/26.11 |
| 8,167,387 B1 | 5/2012 | Quinn | | |
| 10,399,505 B1 * | 9/2019 | Brackman | ............... | B60R 9/065 |
| 10,821,912 B1 * | 11/2020 | Onuschak | ............... | B60R 11/06 |
| 10,889,250 B2 | 1/2021 | Flajnik et al. | | |
| 2002/0179600 A1 | 12/2002 | King | | |
| 2004/0020956 A1 * | 2/2004 | Lobanoff | ............... | B60R 5/047 224/925 |
| 2005/0242138 A1 * | 11/2005 | Warganich | ............... | B60R 7/02 224/404 |
| 2006/0266778 A1 * | 11/2006 | Allotey | ............... | B60R 9/00 224/403 |
| 2006/0279099 A1 * | 12/2006 | Ranka | ............... | B60R 11/06 296/37.6 |
| 2008/0308591 A1 * | 12/2008 | Henderson | ............... | B60R 5/00 224/404 |
| 2009/0255967 A1 * | 10/2009 | Lueder | ............... | B60R 9/00 224/404 |
| 2010/0052353 A1 * | 3/2010 | Shea | ............... | B60R 7/02 296/37.16 |
| 2010/0264180 A1 * | 10/2010 | Allotey | ............... | B60R 11/06 224/404 |
| 2012/0261938 A1 * | 10/2012 | Roach | ............... | B60P 7/0892 29/527.1 |
| 2014/0138977 A1 * | 5/2014 | Schreiber | ............... | B60R 7/04 296/37.5 |
| 2017/0282810 A1 * | 10/2017 | Parra Becerra | ............... | B65D 21/086 |
| 2018/0002063 A1 | 1/2018 | Su | | |
| 2018/0147995 A1 * | 5/2018 | Goldwitz | ............... | B60R 9/06 |
| 2020/0023782 A1 | 1/2020 | Gill et al. | | |
| 2020/0023784 A1 * | 1/2020 | Flajnik | ............... | B60R 9/065 |
| 2020/0223370 A1 * | 7/2020 | Jayakumar | ............... | B60R 9/065 |

* cited by examiner

EXPANDABLE CARGO BOX ASSEMBLY FOR A PICKUP TRUCK

CROSS-REFERENCE TO RELATED APPLICATIONS

This application claims the benefit of prior U.S. Provisional Patent Application Ser. No. 62/791,229, filed Jan. 11, 2019, which is hereby incorporated by reference in its entirety for all purposes.

FIELD OF THE INVENTION

The present invention pertains to the field of cargo holders, in particular to an expandable cargo box for use in a cargo bed of a pickup truck.

BACKGROUND OF THE INVENTION

Pickup trucks have functional attributes that permit them to be used for a range of applications. This is evident in the market, as pickup trucks are immensely popular for both recreational and work-related transport. Pickup trucks are now available in a range of configurations, but are generally regarded as providing an enclosed cab, for the driver and passengers, and an open rear cargo bed. Although the cargo bed is bordered by two sidewall sections, and a rear tailgate, the top side of the cargo bed is open, therein resulting in certain issues relating to security, privacy and general securement of items contained therein.

To ensure items placed within the cargo area are protected from being stolen and/or vandalized, and to prevent inadvertent loss due to items falling out of the cargo bed during transport, a variety of cargo bed storage systems have been proposed. While traditional cargo bed storage systems have found great utility in transporting a range of items, they can be cumbersome and take up valuable cargo space in the cargo bed, which is a disadvantage when the full cargo bed is needed to be used. It is therefore desirable to provide a storage system that is functional yet can be stowed away to avoid taking up space in the cargo bed when not in use.

SUMMARY

According to an embodiment hereof, an expandable cargo box assembly is disclosed for mounting on a side wall section of a cargo bed of a pickup truck. The expandable cargo box assembly includes a base member for attaching the expandable cargo box assembly to the side wall section of the cargo bed, the base member having the form of an outer wall plate. Opposite the outer wall plate is an inner wall plate, the inner wall plate being displaceable from a first position to a second position, the first position defining a collapsed state, and the second position defining a deployed state. The outer and inner wall plates have operably associated therebetween a folding floor assembly, and the outer wall plate supports a forward folding wall and a rearward folding wall. Upon expanding the expandable cargo box assembly to a deployed state, the folding floor assembly and the forward and rearward folding walls are arranged to define an enclosure for receiving cargo.

BRIEF DESCRIPTION OF THE DRAWINGS

The foregoing and other features and advantages of the invention will be apparent from the following description of embodiments thereof as illustrated in the accompanying drawings. The accompanying drawings, which are incorporated herein and form a part of the specification, further serve to explain the principles of the invention and to enable a person skilled in the pertinent art to make and use the invention. The drawings are not to scale.

DETAILED DESCRIPTION OF EMBODIMENTS OF THE PRESENT INVENTION

Figure 1:
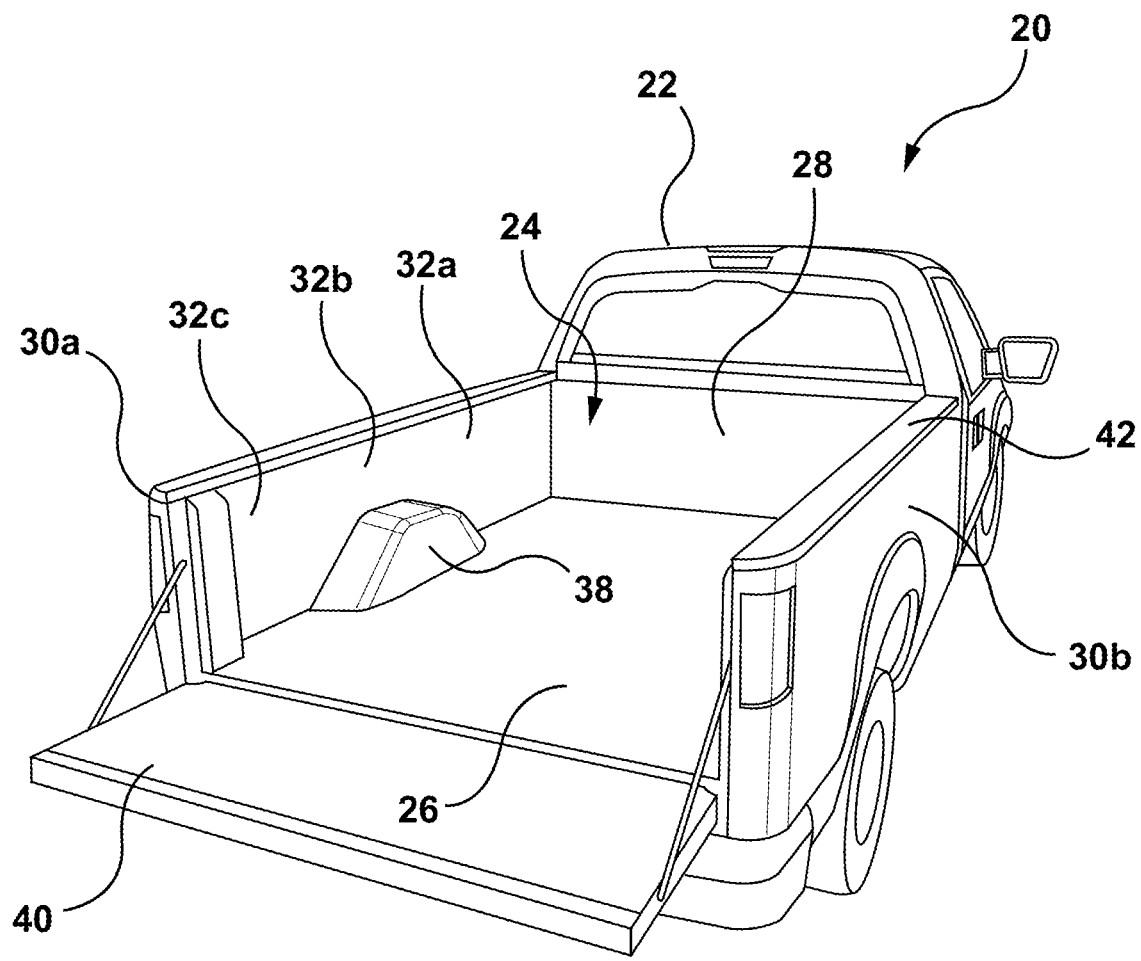
FIG. 1 is a perspective rear view of a pickup truck, showing aspects of a cargo bed.

Specific embodiments of the present invention will now be described with reference to the figures, wherein like reference numbers indicate identical or functionally similar elements. The following detailed description is merely exemplary in nature and is not intended to limit the disclosure or the application and uses of the disclosure. A person skilled in the relevant art will recognize that other states and arrangements can be used without departing from the scope of the disclosure. Furthermore, there is no intention to be bound by any expressed or implied theory presented in the preceding technical field or the following detailed description.

It should be noted that in the description, terms such as forward, front and derivations of these terms are intended to mean or refer to an orientation directed towards, or a location situated towards the front of the vehicle or component in question relative to its orientation within a vehicle. Similarly, terms such as rearward, rear and derivations of these terms are intended to mean or refer to an orientation directed towards, or a location situated towards the back of the vehicle or component in question relative to its orientation within a vehicle. Terms such as up, upper, upward, and derivations of these terms are intended to mean or refer to an orientation that is above or on a top-side of the vehicle or component in question relative to its orientation within a vehicle. Terms such as lower, down, downward, and derivations of these terms are intended to mean or refer to an orientation that is below or on a bottom-side vehicle or component in question relative to its orientation within a vehicle. The term outer, outboard, outside and derivations of these terms is intended to mean or refer to an orientation directed towards, or a location situated outwardly from the side of the vehicle or component in question relative to its orientation within a vehicle. The term inner, inboard, inside and derivations of these terms is intended to mean or refer to an orientation directed towards, or a location situated towards the longitudinal centerline of the vehicle, or component in question relative to its orientation within a vehicle.

In addition, the terms "preferably," or "in particular," "for example" or similar terms are used in association with optional features without thereby restricting alternative embodiments. Thus, features which are introduced by these terms are optional features, and there is no intention to restrict the scope of protection of the claims and, in particular, the independent claims by means of these features. Thus, as a person skilled in the art will recognize, the invention can also be implemented using different embodiments. In a similar way, features which are introduced by "in one embodiment of the invention" or by "in one illustrative embodiment of the invention" are understood to be optional features without any intention thereby to restrict alternative embodiments or the scope of protection of the independent claims. Moreover, these introductory expressions are not intended to affect all the ways of combining the features introduced thereby with other features, whether optional or non-optional features.

Construction of Truck

Referring now to FIG. 1, shown is a pickup truck 20 having a cab 22 and a cargo bed 24 situated rearward therefrom. The cargo bed 24 includes a floor 26, an upstanding forward wall 28 immediately adjacent and rearward of the cab 22, and two upstanding opposing side-wall sections, namely first side wall section 30a and second side wall section 30b. Each side wall section 30a, 30b includes a forward side-wall portion 32a, an intermediate side-wall portion 32b, and a rearward side-wall portion 32c (collectively side-wall portion 32), the forward and rearward side-wall portions 32a, 32c being separated by a wheel well 38, and the intermediate side-wall portion 32b being situated generally above the wheel well 38. Opposite to the forward wall 28 towards the rear of the cargo bed 24 is situated a tailgate 40. The tailgate 40 includes a hinge assembly (not shown) permitting the tailgate 40 to pivot from a generally vertical/upright closed position, to a generally horizontal open position as required by the operator. As shown, the tailgate 40 is in an open position. The forward wall 28 and the two opposing side wall sections 30a, 30b define an upper wall surface that is generally planar. The upper wall surface is collectively regarded as the bed rail 42.

Cargo Box Assembly

Figure 2:
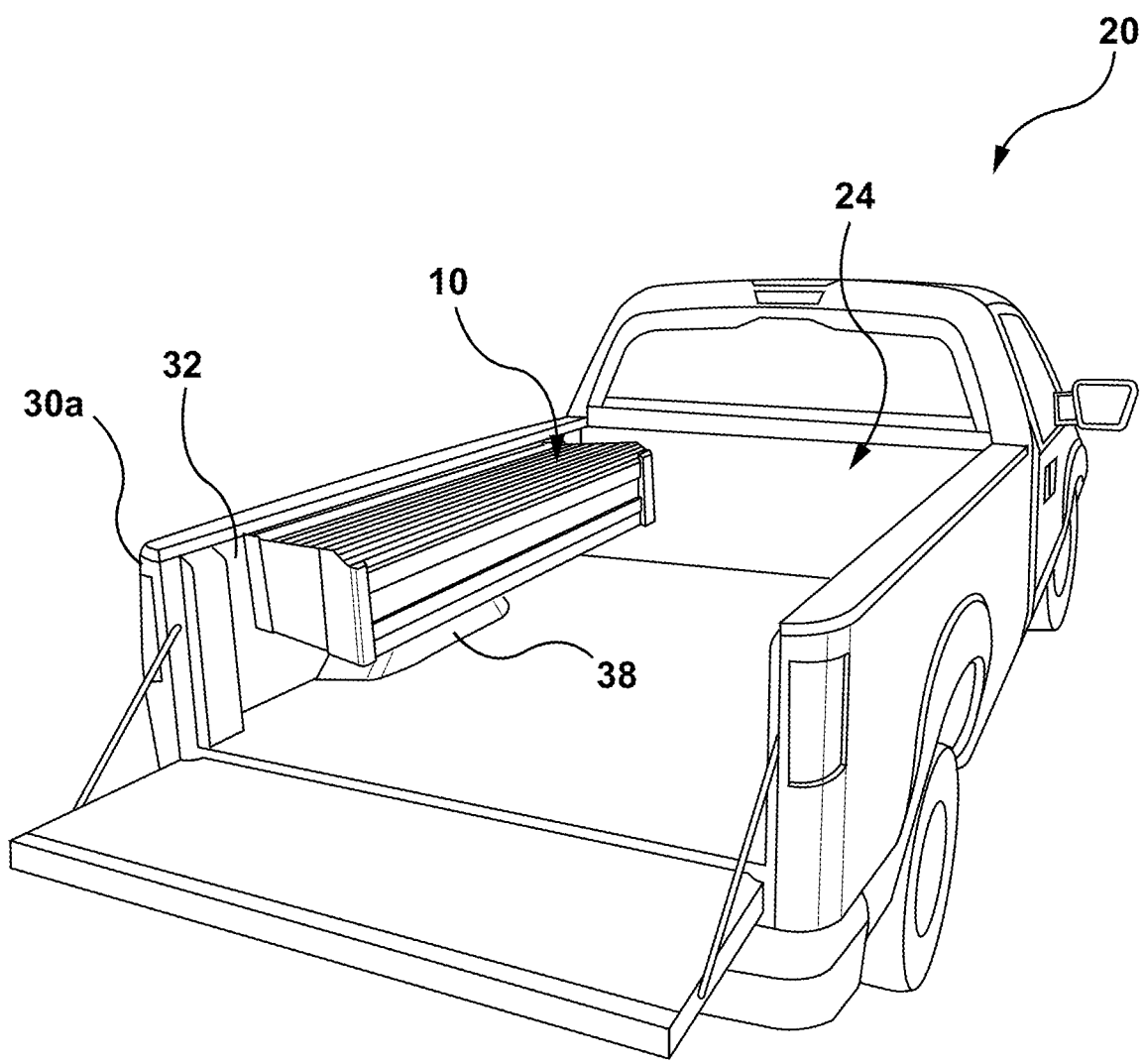
FIG. 2 is a perspective rear view of the pickup truck on FIG. 1, with an expandable cargo box assembly in accordance with an embodiment hereof mounted on a side wall of the cargo bed.

Referring now to FIG. 2, an expandable cargo-box assembly 10 in accordance with an embodiment hereof is shown mounted to the side-wall portion 32 of the first side-wall section 30a in the expanded state. The cargo box assembly 10 is configured to be mounted upon the side wall sections 30a, 30b of the cargo bed 24, in particular the area defined by the side-wall portion 32 above the wheel well 38. Depending on the intended purpose and required functionality, a cargo bed 24 may contain a single cargo box assembly 10, or a pair of cargo box assemblies 10, that is one placed on each side of the cargo bed 24. To simplify the description which follows, the cargo box assembly 10 will be described with reference to being mounted upon the side wall portion 32 of the side wall section 30a.

Cargo Box Assembly—Inner and Outer Wall Plates

Figure 3:
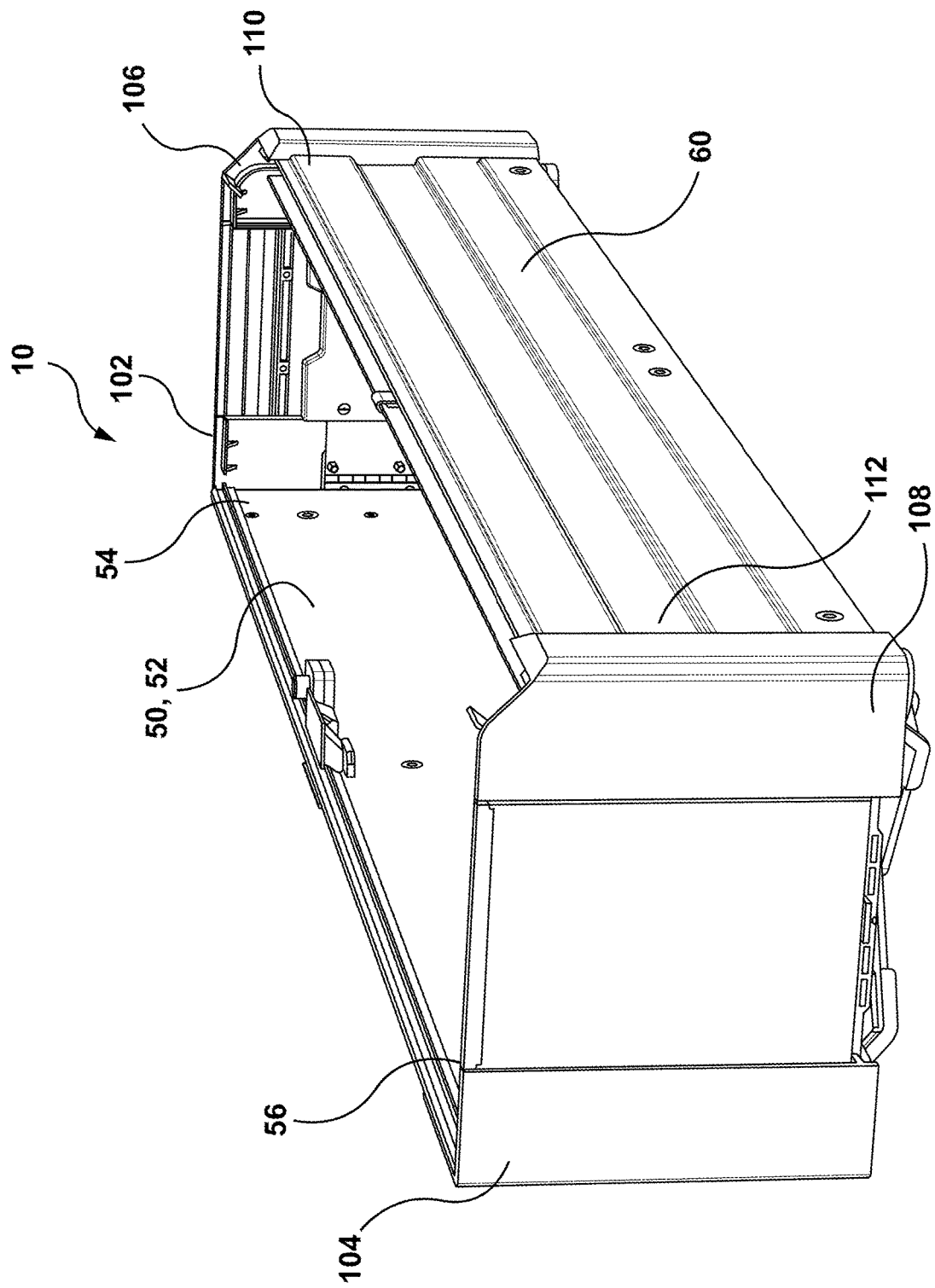
FIG. 3 is a perspective side view of the cargo box assembly of FIG. 2, shown in a deployed state, and without a lid to permit for viewing portions of an interior space thereof.
Figure 18:
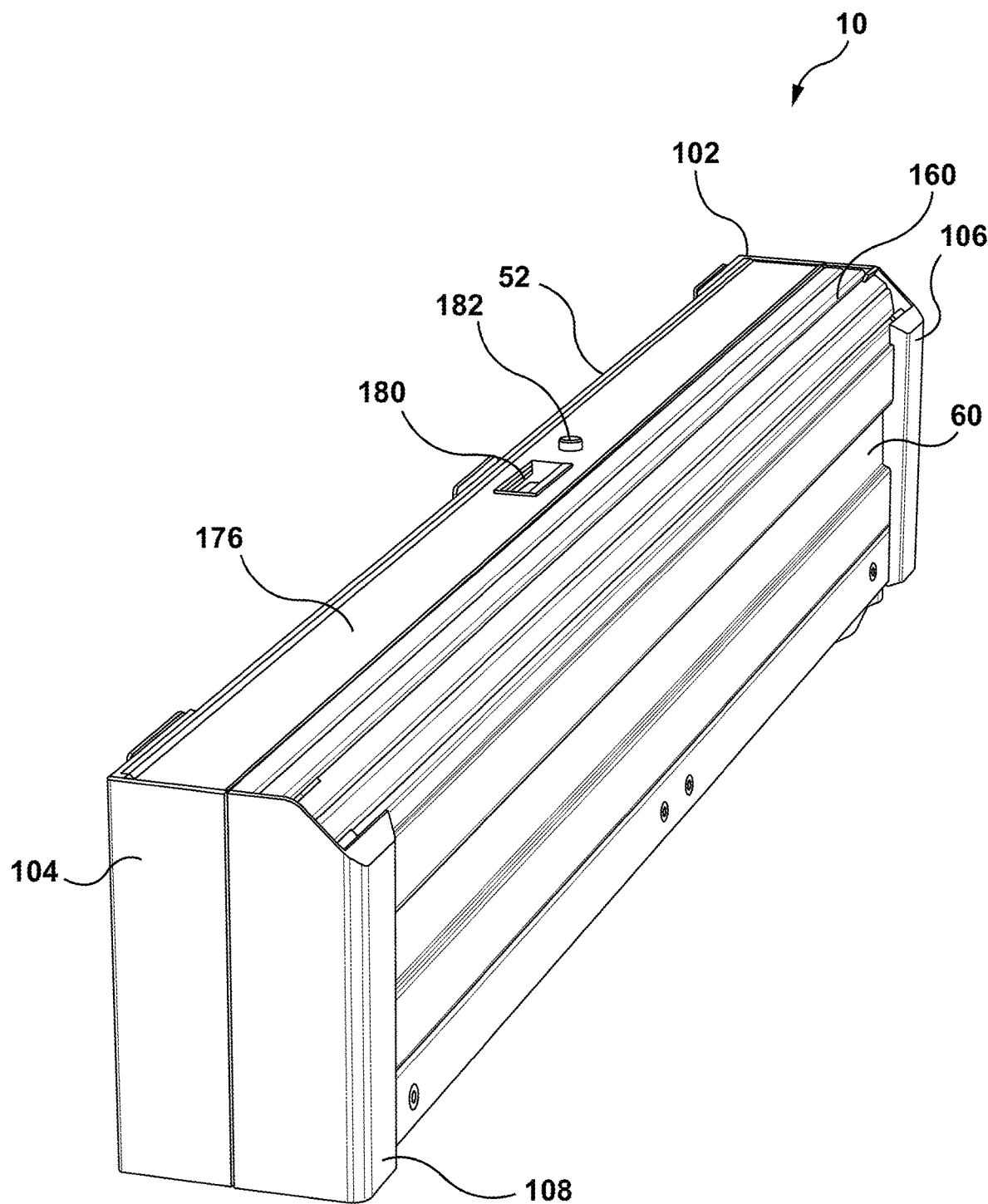
FIGS. 18 and 19 are perspective side views of the cargo box assembly according to FIG. 3, showing the cargo box assembly in the collapsed and deployed states, respectively.
Figure 19:
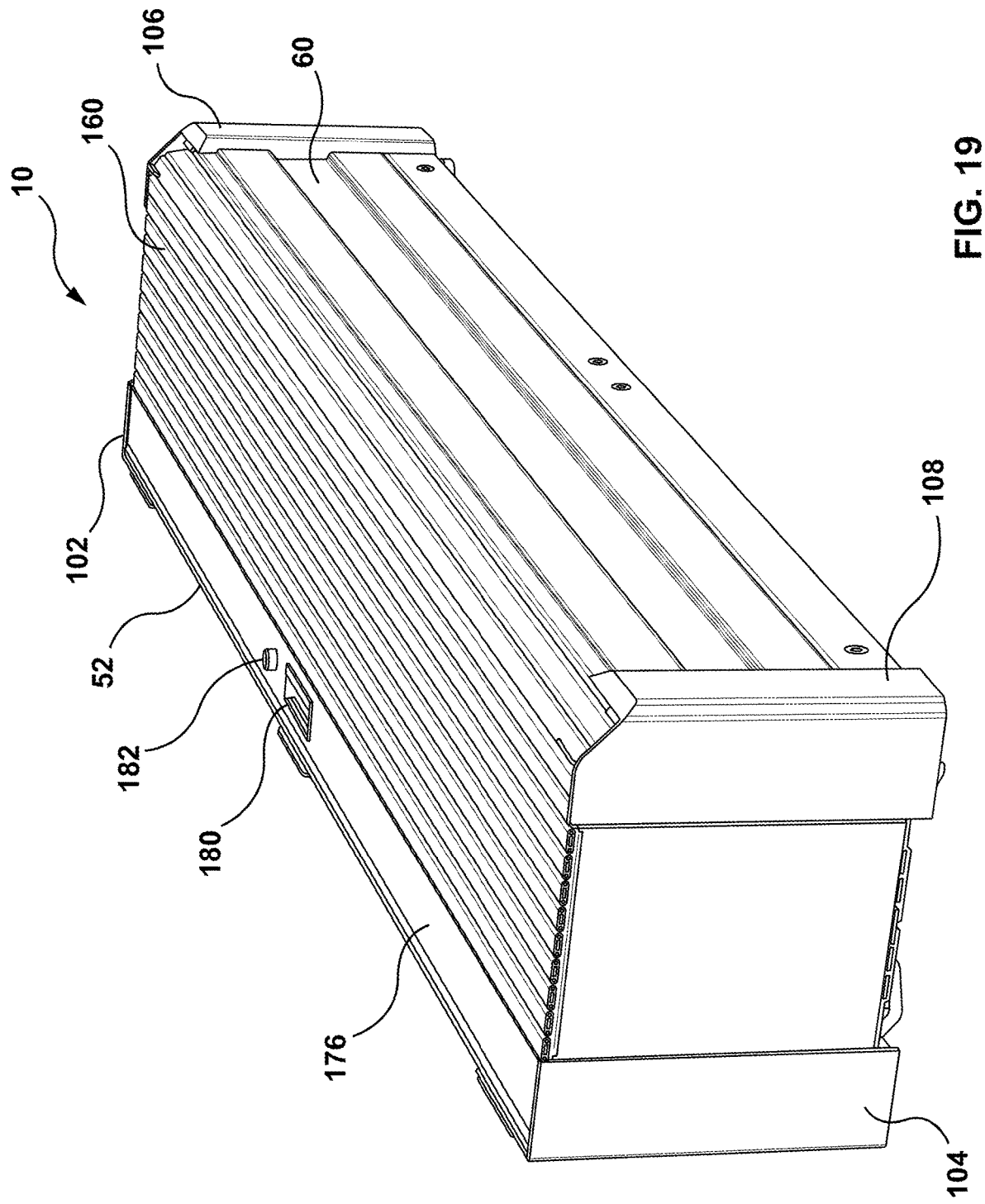

With reference now to FIG. 3 (showing the cargo box assembly without a lid; the complete cargo box assembly can be viewed in FIGS. 18 and 19), the cargo box assembly 10 includes a base member 50 that is configured to be mounted to the side wall portion 32 of the side wall section 30a of the cargo bed 24. The base member 50 generally takes the form of an outer wall plate 52, that defines a first longitudinal side of the cargo box assembly 10, the outer wall plate 52 having a forward end 54, and a rearward end 56. Opposite to the outer wall plate 52 is an inner wall plate 60 that defines a second longitudinal side of the cargo box assembly 10.

Cargo Box Assembly—Folding Floor Assembly

Figure 4A:
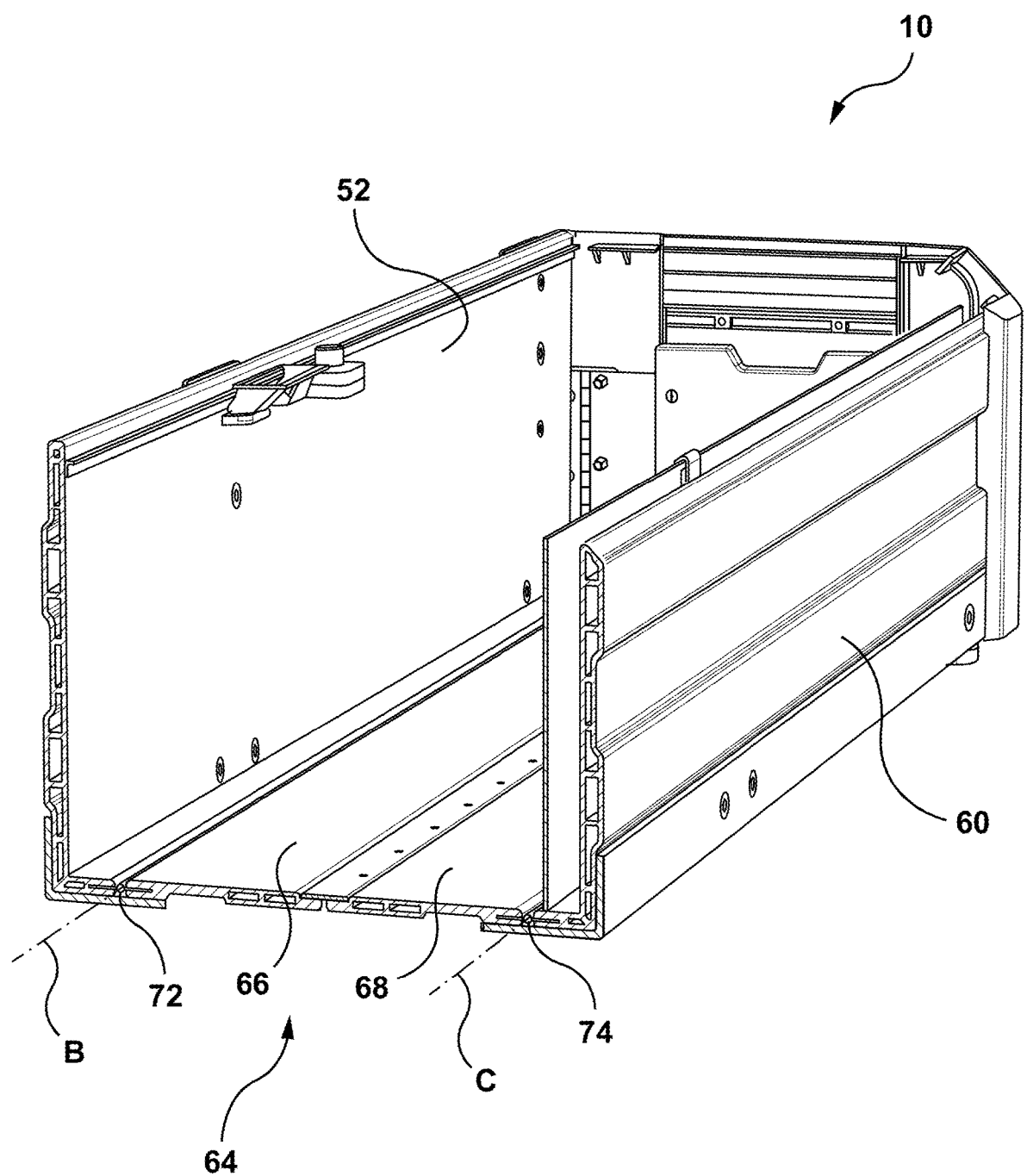
FIG. 4*a* is a perspective cross-sectional side view of the cargo box assembly according to FIG. 3, shown in the deployed state, and without the lid to permit for viewing portions of the interior space thereof.
Figure 4B:
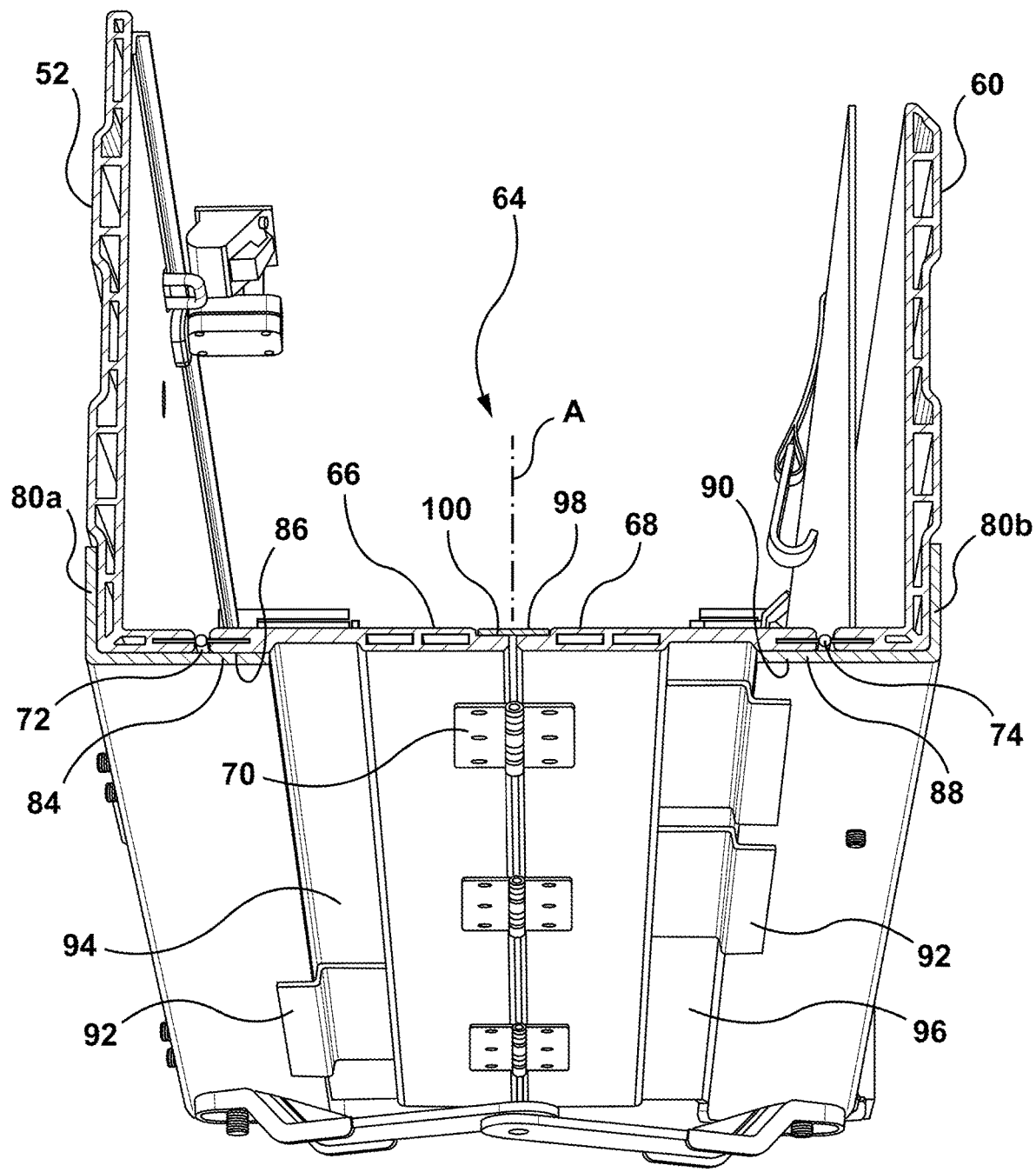
FIG. 4*b* is a perspective cross-sectional bottom view of the cargo box assembly according to FIG. 3, shown in the deployed state, and without the lid.
Figure 5:
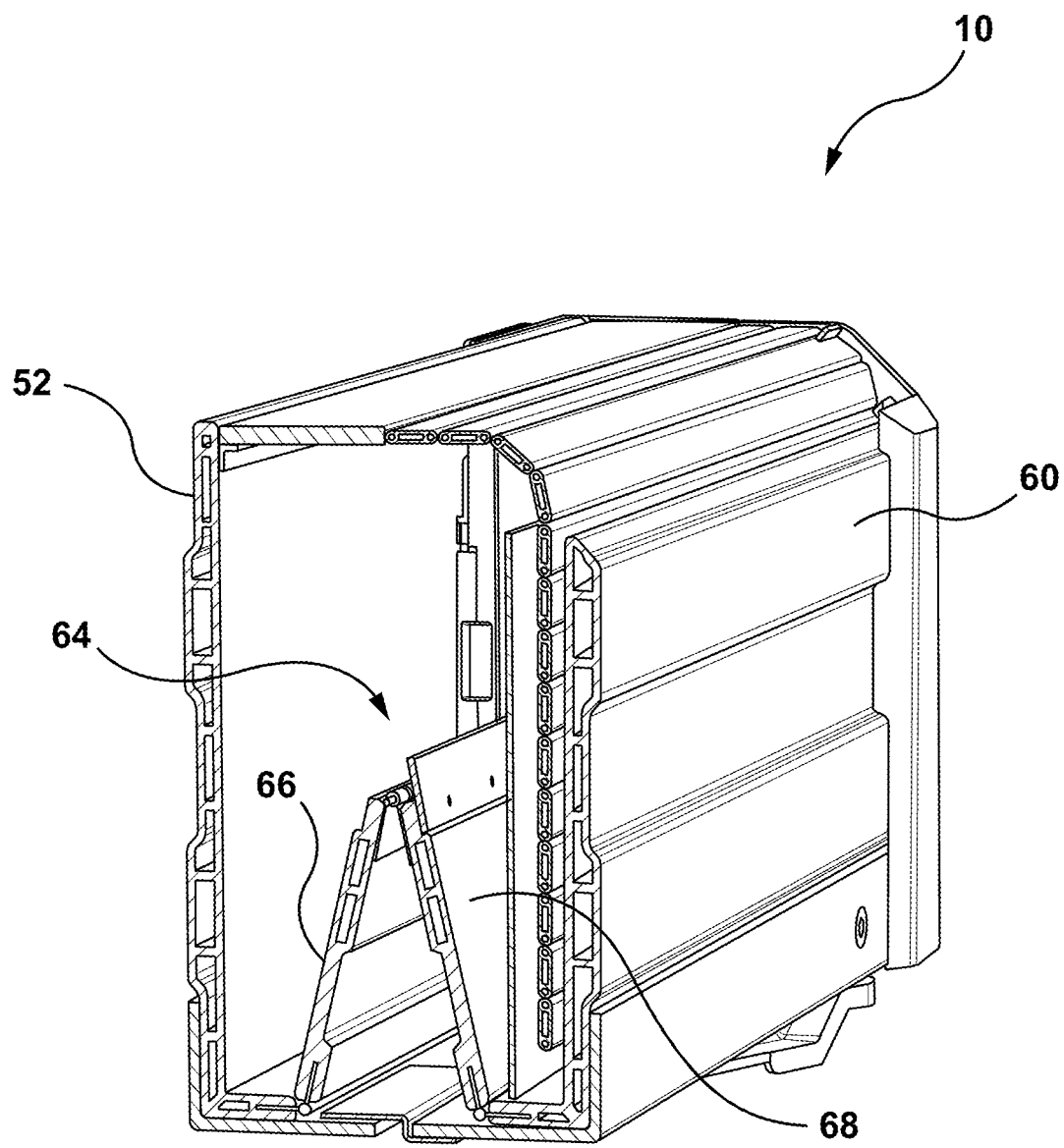
FIG. 5 is a perspective cross-sectional side view of the cargo box assembly according to FIG. 3, shown in a collapsed state.
Figure 6:
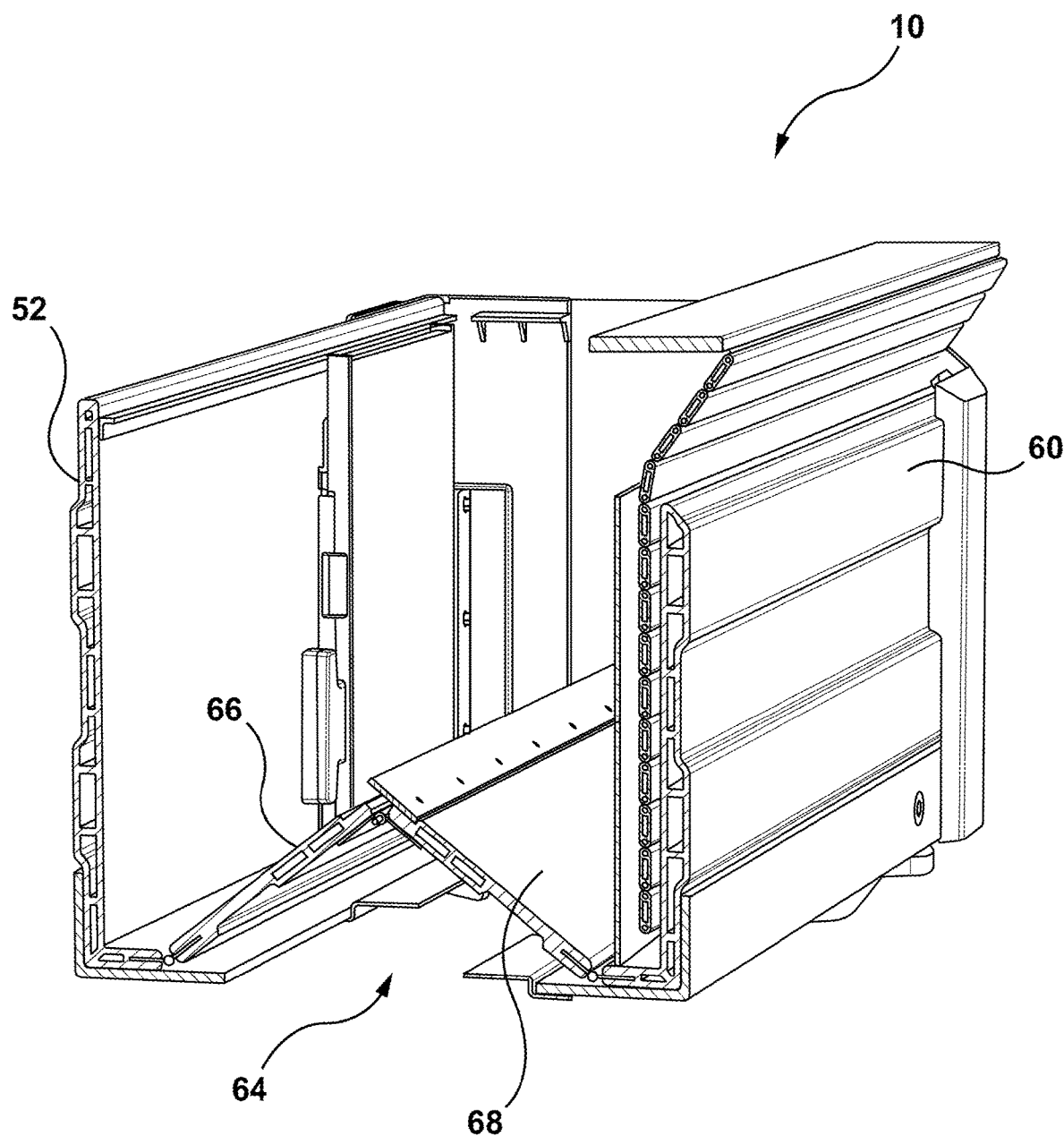
FIG. 6 is a perspective cross-sectional side view of the cargo box assembly according to FIG. 3, shown in an intermediate deployed state.
Figure 7:
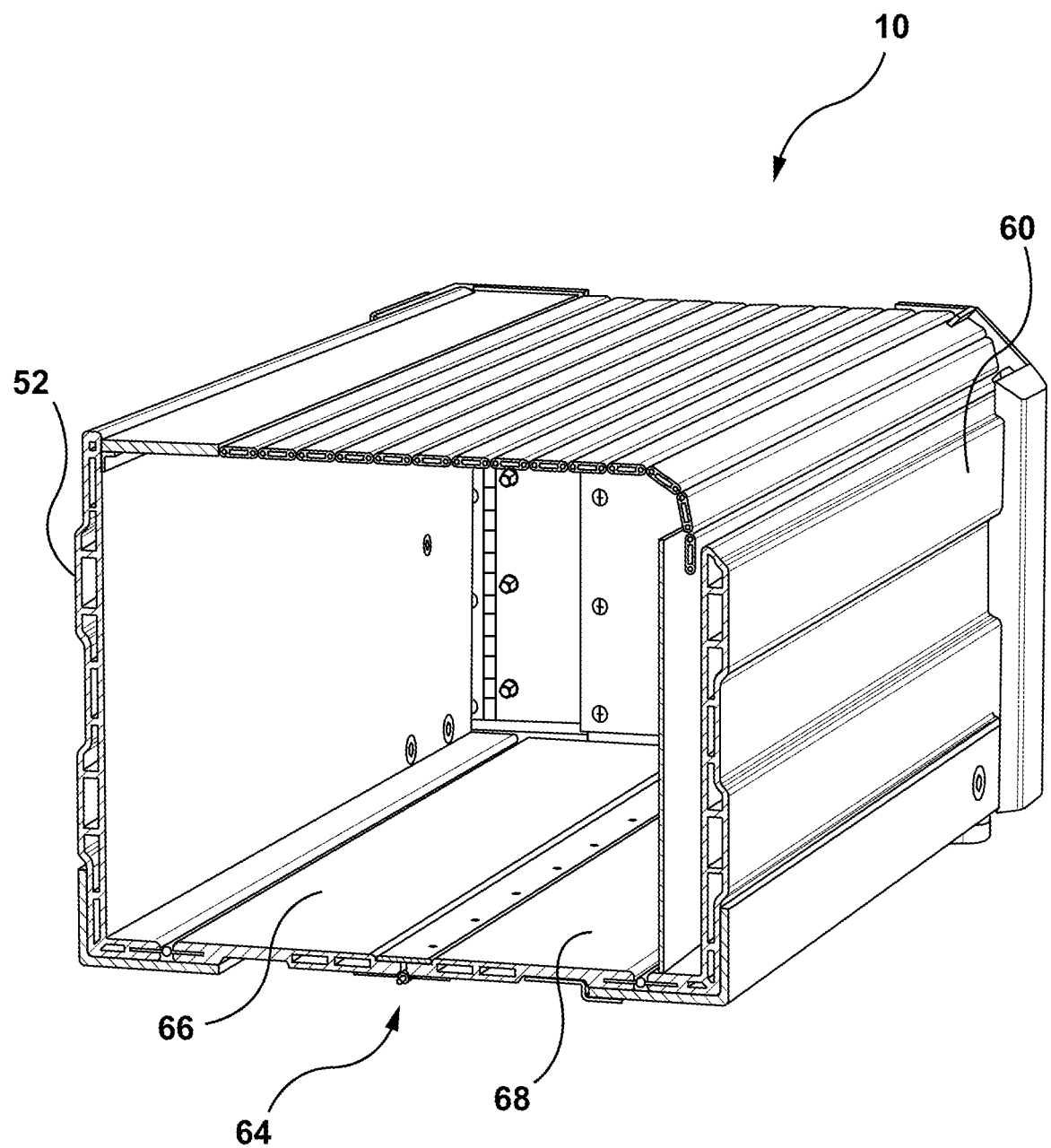
FIG. 7 is a perspective cross-sectional side view of the cargo box assembly according to FIG. 3, shown in the deployed state with the lid.
Figure 8:
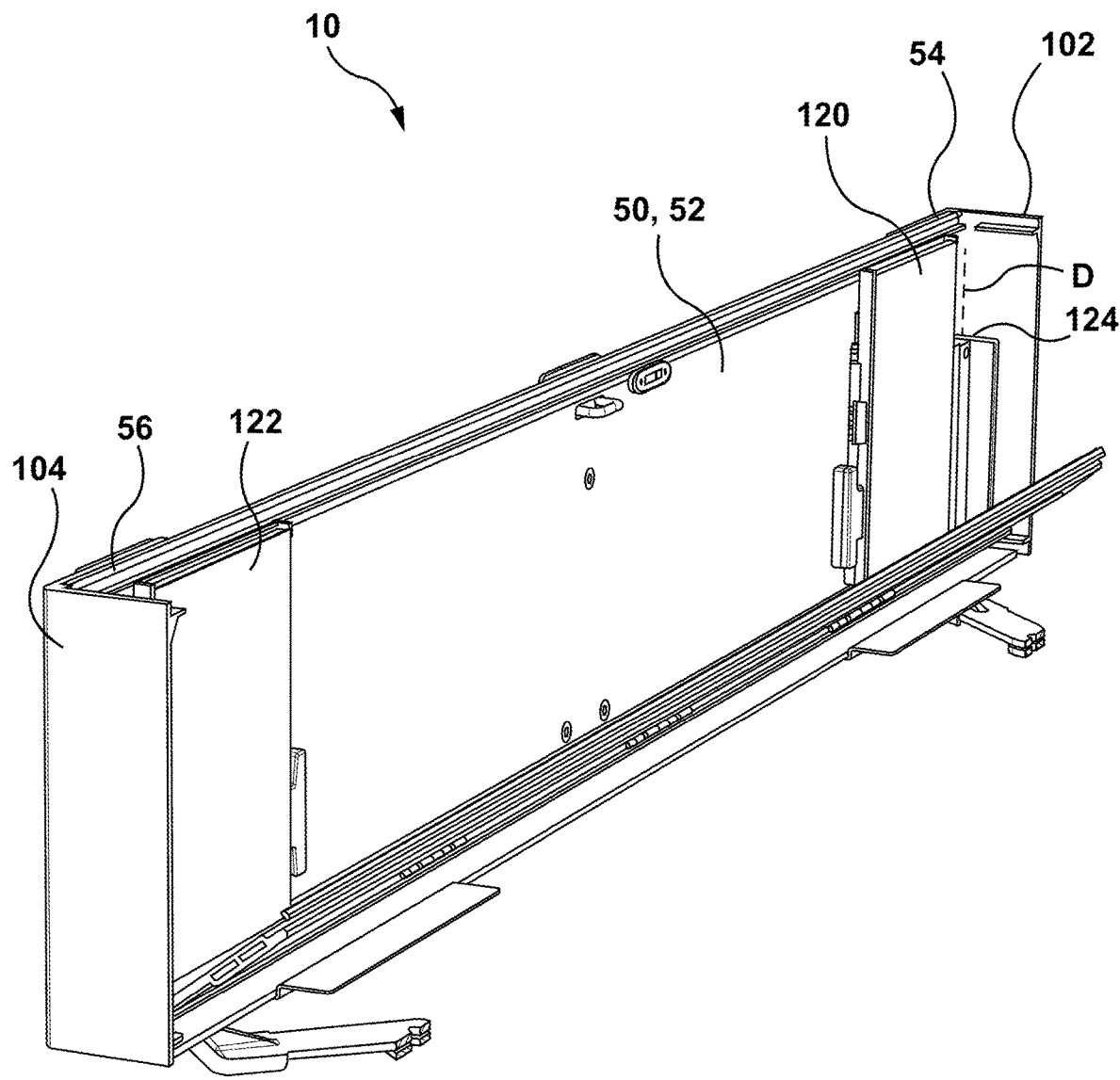
FIG. 8 is a perspective sectional side view of the cargo box assembly according to FIG. 3, shown in the intermediate deployed state, and without the lid to permit for viewing portions of the interior space thereof.

The outer wall plate 52 is operably attached to the inner wall plate 60 through a folding floor assembly 64. With reference to FIGS. 4a and 4b, the folding floor assembly 64 includes a first floor panel 66 and a second floor panel 68, the first and second floor panels 66, 68 being hingedly connected by way of first floor hinge 70 operable about a pivot axis A. In turn, the first floor panel 66 is hingedly attached to a lower longitudinal edge of the outer wall plate 52 of the base member 50, by way of a suitable second floor hinge 72 operable about pivot axis B; the second floor panel 68 is hingedly attached to a lower longitudinal edge of the inner wall plate 60, by way of a suitable third floor hinge 74 operable about pivot axis C. The outer wall plate 52 is configured to be fixedly attached to the side wall section 30 of the cargo bed 24, as will be described in greater detail below. The inner wall plate 60 is configured to be movable from a first position that defines a collapsed state of the cargo box assembly, and a second position that defines a deployed state of the cargo box assembly. The cross-sectional views shown in FIG. 5 (collapsed state), FIG. 6 (intermediate state), and FIG. 7 (deployed state) show the motion of the folding floor assembly 64 during deployment/collapsing of the cargo box assembly.

Each of the outer and inner wall plates 52, 60 includes a floor support bracket. With reference to FIG. 4b, the outer wall plate 52 includes a first floor support bracket 80a, while the inner wall plate 60 includes a second floor support bracket 80b. In the embodiment shown, the first and second floor support brackets 80a, 80b (collectively 80) extend along substantially the full length of each respective outer and inner wall plate 52, 60. It will be appreciated, however, that the floor support brackets may be dimensioned to extend over only a portion of the respective wall plate, and where shorter floor support brackets are utilized, more than one floor support bracket may be included for each respective wall plate. The floor support brackets are fixedly attached to the respective wall plate using a suitable means of attachment including but not limited to threaded fasteners, adhesives and welding. The floor support bracket is configured with a support base that extends under a portion of the folding floor assembly 64, so as to provide support to the underside thereof. As shown, the support base 84 of the first floor support bracket 80a supports the first floor panel 66 at first support surface 86, while the support base 88 of the second floor support bracket 80b supports the second floor panel 68 at second support surface 90. The floor support brackets 80 may additionally include one or more bracket extenders 92 to provide additional support to portions of the folding floor assembly from the underside thereof. As shown, a pair of bracket extenders 92 are included on the first floor support bracket 80a that extend to provide support to a third support surface 94 on the underside of the first floor panel 66. Similarly, a pair of bracket extenders 92 are included on the second floor support bracket 80b that extend to provide support to a forth support surface 96 on the underside of the second floor panel 68. The bracket extenders 92 are fixedly attached to the respective floor support bracket using a suitable means of attachment including but not limited to threaded fasteners, adhesives and welding. As a further means to support the folding floor assembly 64, in particular to prevent over extension of the folding floor assembly under load, includes an overlap tab 98. In the embodiment shown, the overlap tab 98 is fixedly attached to second floor panel 68, and on deployment, is seated in a recess 100 disposed within the adjacently positioned first floor panel 66.

Cargo Box Assembly—Folding Walls

With reference now to FIGS. 3, 8 and 9a to 9d, shown are various views of the cargo box assembly 10. Each of the outer and inner wall plates support a corner bracket at each of their forward and rearward ends. The outer wall plate 52 includes a forward corner bracket 102 at the forward end 54, and a rearward corner bracket 104 at the rearward end 56. Similarly, the inner wall plate 60 includes a forward corner bracket 106 at the forward end 110 and a rearward corner bracket 108 at the rearward end 112. The corner brackets are fixedly attached to the respective wall panels using a suitable means of attachment including but not limited to threaded fasteners, adhesives and welding.

The corner brackets include a means for supporting the folding walls that close off the forward and rearward portions of the cargo box upon extending the inner wall plate 60 to the deployed state. A forward folding wall 120 is disposed at a forward end of the cargo box assembly 10, and similarly, a rearward folding wall 122 is disposed at a rearward end of the cargo box assembly 10. As the forward and rearward folding walls 120, 122 are configured in a similar manner, only the forward folding wall 120 will be discussed in detail. Accordingly, it will be appreciated that the various aspects described having regard to the forward folding wall 120 are equally applicable to the rearward folding wall 122.

Figure 9A:
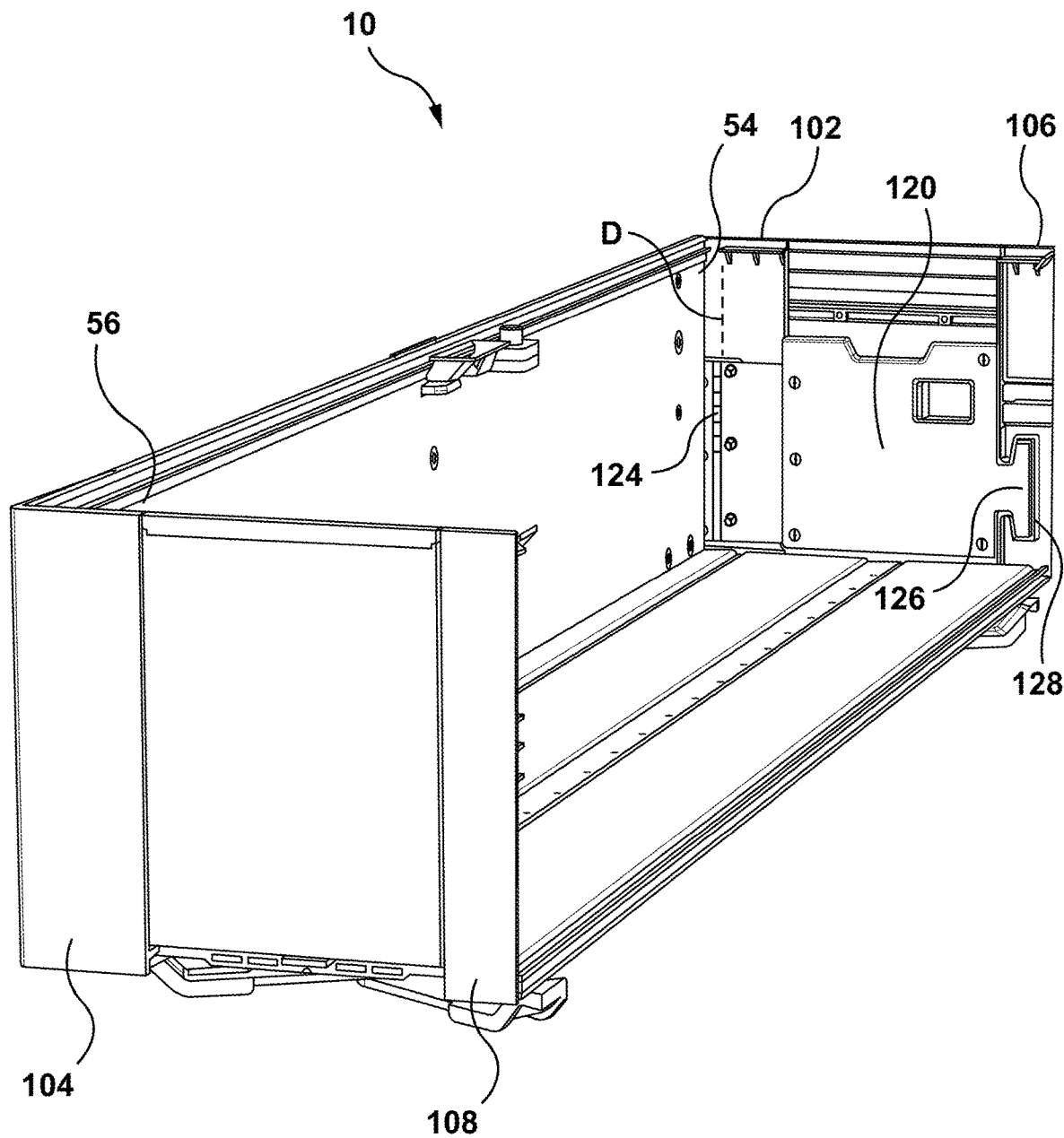
FIG. 9*a* is a perspective sectional side view of the cargo box assembly according to FIG. 3, shown in the deployed state, and without the lid to permit for viewing portions of the interior space thereof.
Figure 10:
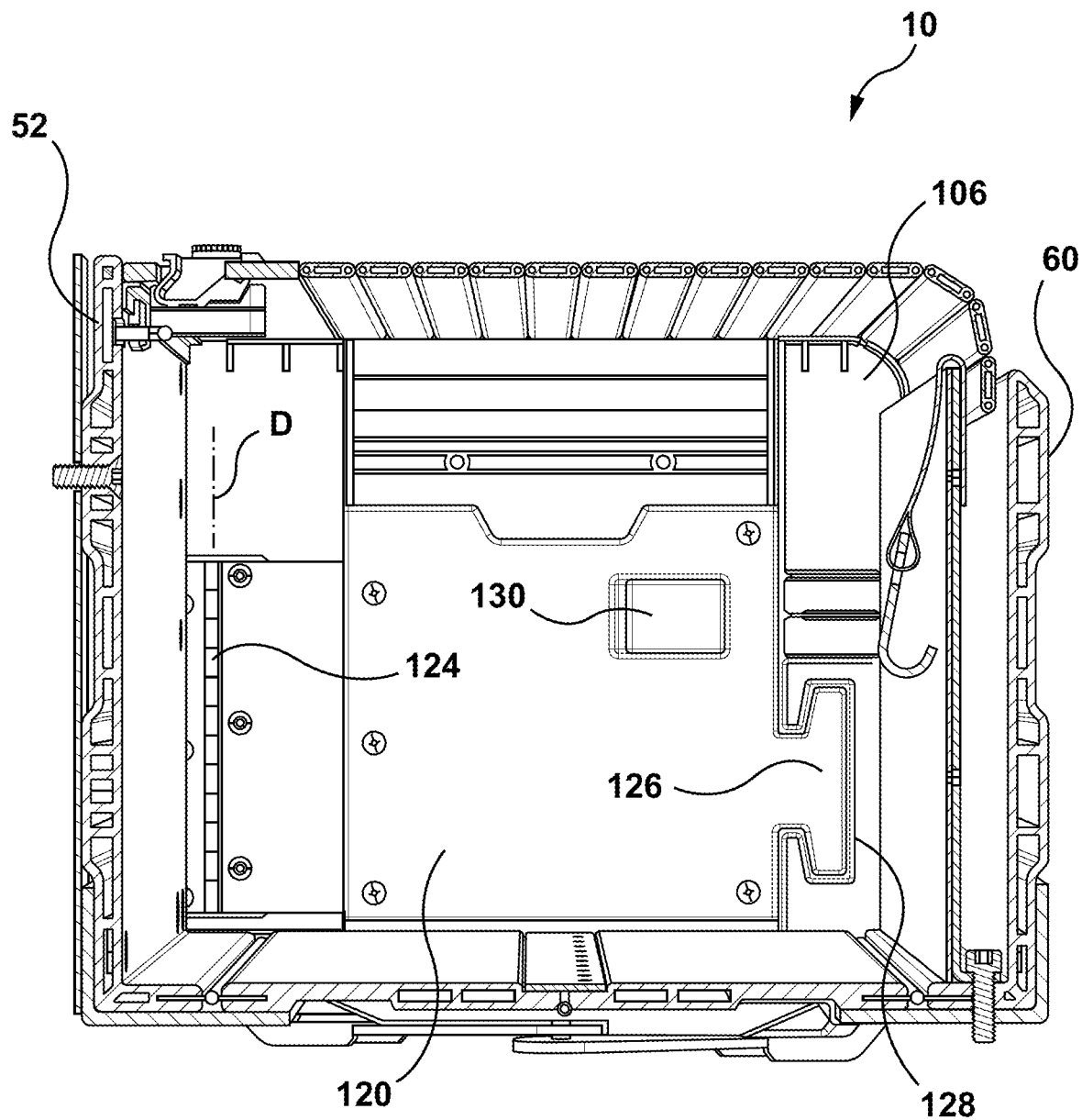
FIG. 10 is a perspective lateral sectional rearward view of the cargo box assembly according to FIG. 3, shown in the deployed state.

In the collapsed and partially collapsed states (partially collapsed shown in FIG. 8), the forward folding wall 120 folds up against the outer wall plate 52. To achieve this, the forward folding wall 120 is hingedly attached to the forward corner bracket 102 by a first wall hinge 124 operable about a pivot axis D. Accordingly, the forward folding wall 120 is able to rotate about pivot axis D and fold up against the outer wall plate 52 as previously described. On rotation of the forward folding wall 120 from the collapsed state to the deployed state, the forward folding wall 120 interlocks with the forward corner bracket 106 of the inner wall plate 60, as shown in FIGS. 9a and 10. The interlock may be achieved in a number of ways. In the embodiment shown, the interlock is achieved by way of an integral interlock pin 126 formed on the forward folding wall 120 that is received in a complementary shaped recess 128 formed on the forward corner bracket 106 of the inner wall plate 60. The mechanical interlock is similar to that of a dovetailed joint, therein providing strength to the mechanical joint formed between the forward folding wall 120 and the forward corner bracket 106 when the cargo box assembly 10 is in the fully deployed state. Although the embodiment shown uses a single interlock pin 126, in other embodiments a plurality of interlock pins 126 may be implemented.

To keep the forward folding wall 120 in the fully deployed state, that is interlocked with the forward corner bracket 106 of the inner wall plate 60, a suitable retainer mechanism may be implemented. As shown, the retainer mechanism takes the form of a latch 130 that is incorporated into the body of the forward folding wall 120. The latch 130 is generally configured to include a retractable lock element (not shown) that extends from the body of the forward folding wall 120 and engages the forward corner bracket 106 of the inner wall plate 60. The latch 130 may be configured with a spring that places a biasing force on the lock element to keep it in the engaged (i.e. locked) position.

Figure 9B:
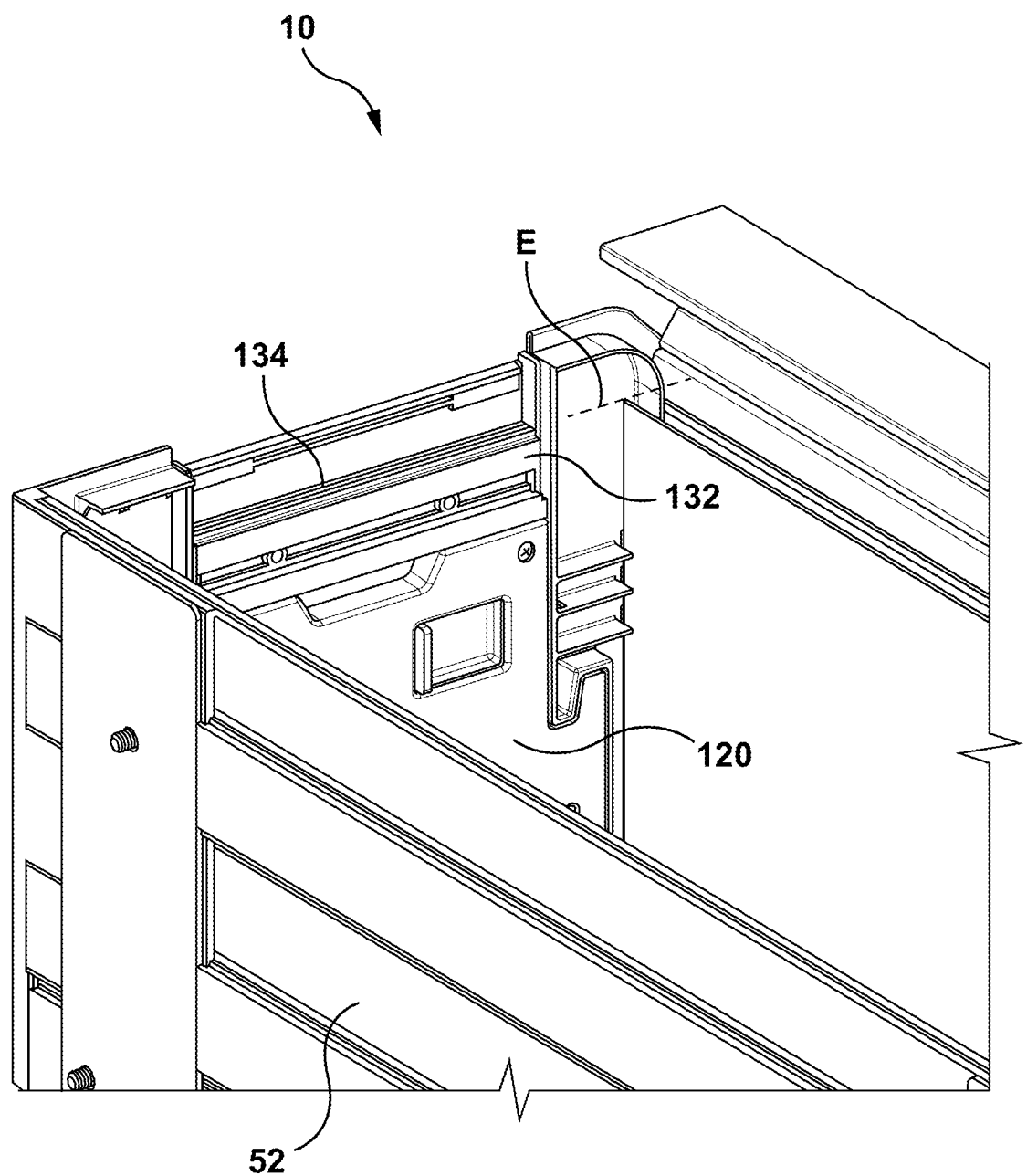
FIG. 9*b*, FIG. 9*c* and FIG. 9*d* are perspective views of the cargo box assembly according to FIG. 3, showing a deployable track panel in folded, intermediate and deployed positions, respectively.
Figure 9C:
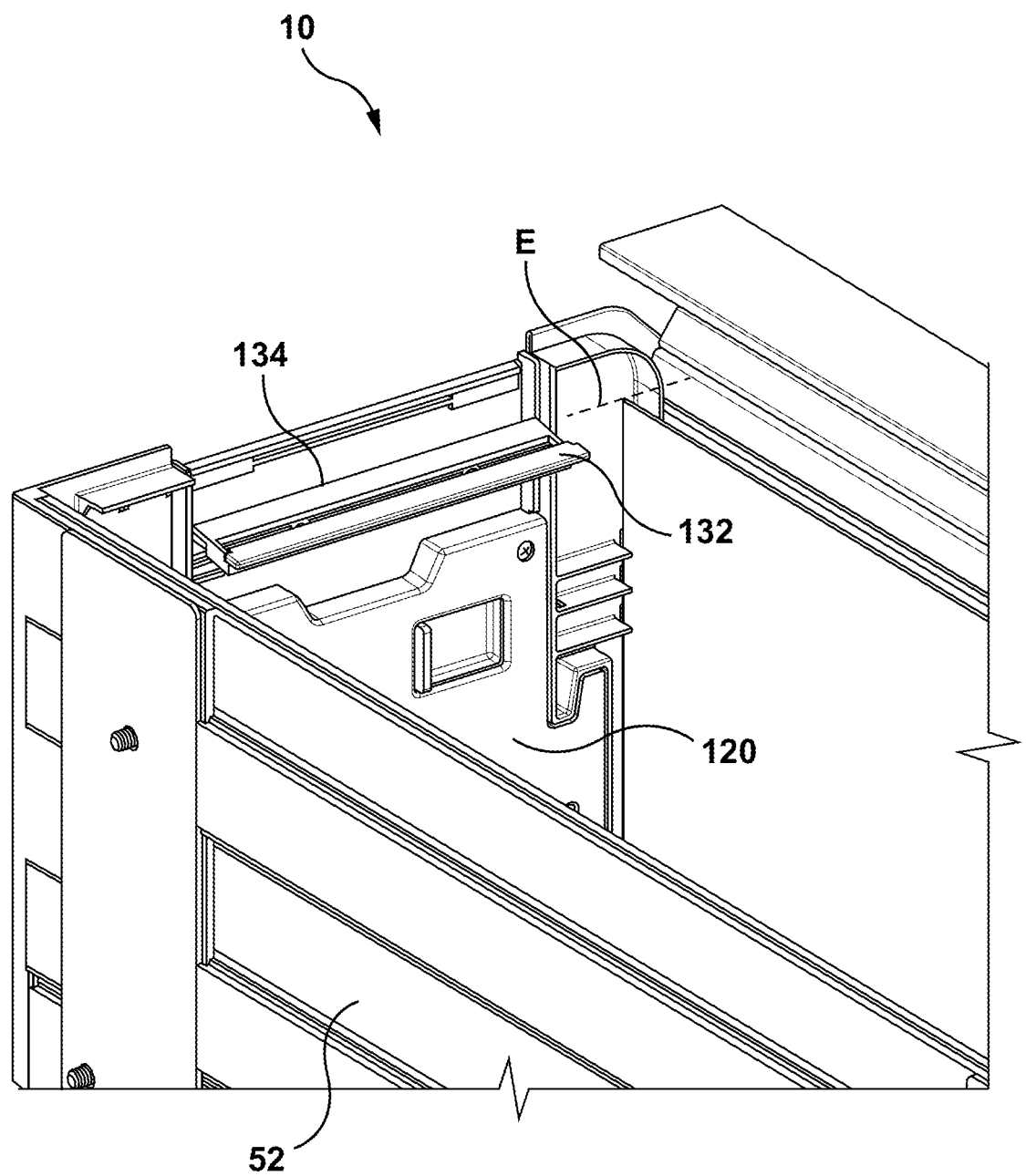
Figure 9D:
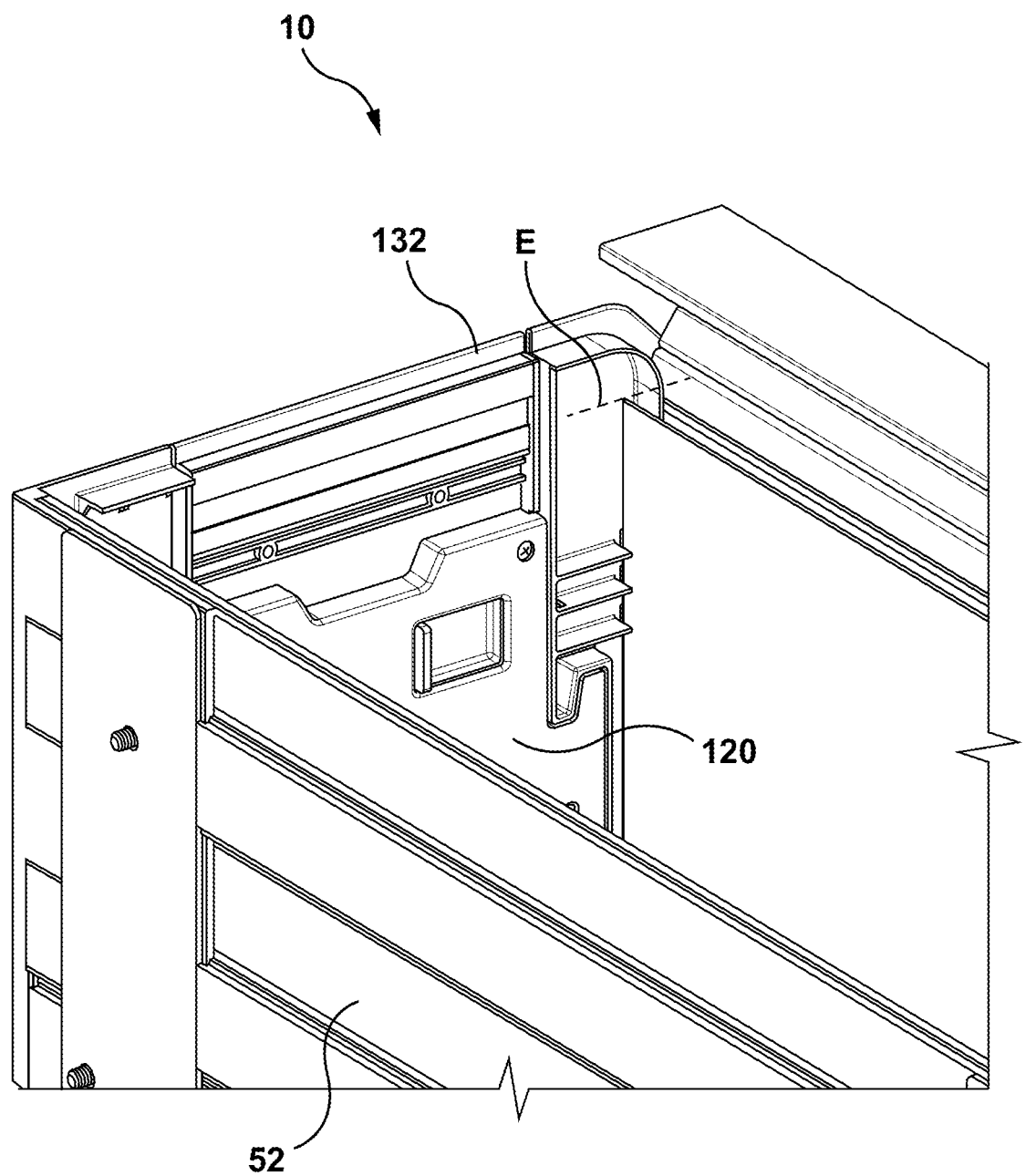

With reference now to FIGS. 9a, 9b, 9c, the forward folding wall 120 is shown to include a track panel 132. The track panel 132 is hingedly connected to the forward folding wall 120 through a folding wall hinge 134, operable about pivot axis E. In the collapsed and intermediate states, the track panel 132 is folded downward, into the arrangement shown in FIG. 9a. On placement of the forward folding wall 120 into the fully deployed state, the track panel 132 is rotated upwards about pivot axis E (intermediate position shown in FIG. 9b) to the deployed position, shown in FIG. 9c. As will be described in greater detail below, the track panel 132 provides additional support/guidance for the opening/closing of the lid during use of the cargo box assembly 10.

Load Supporting Linkage Mechanism

Figure 11:
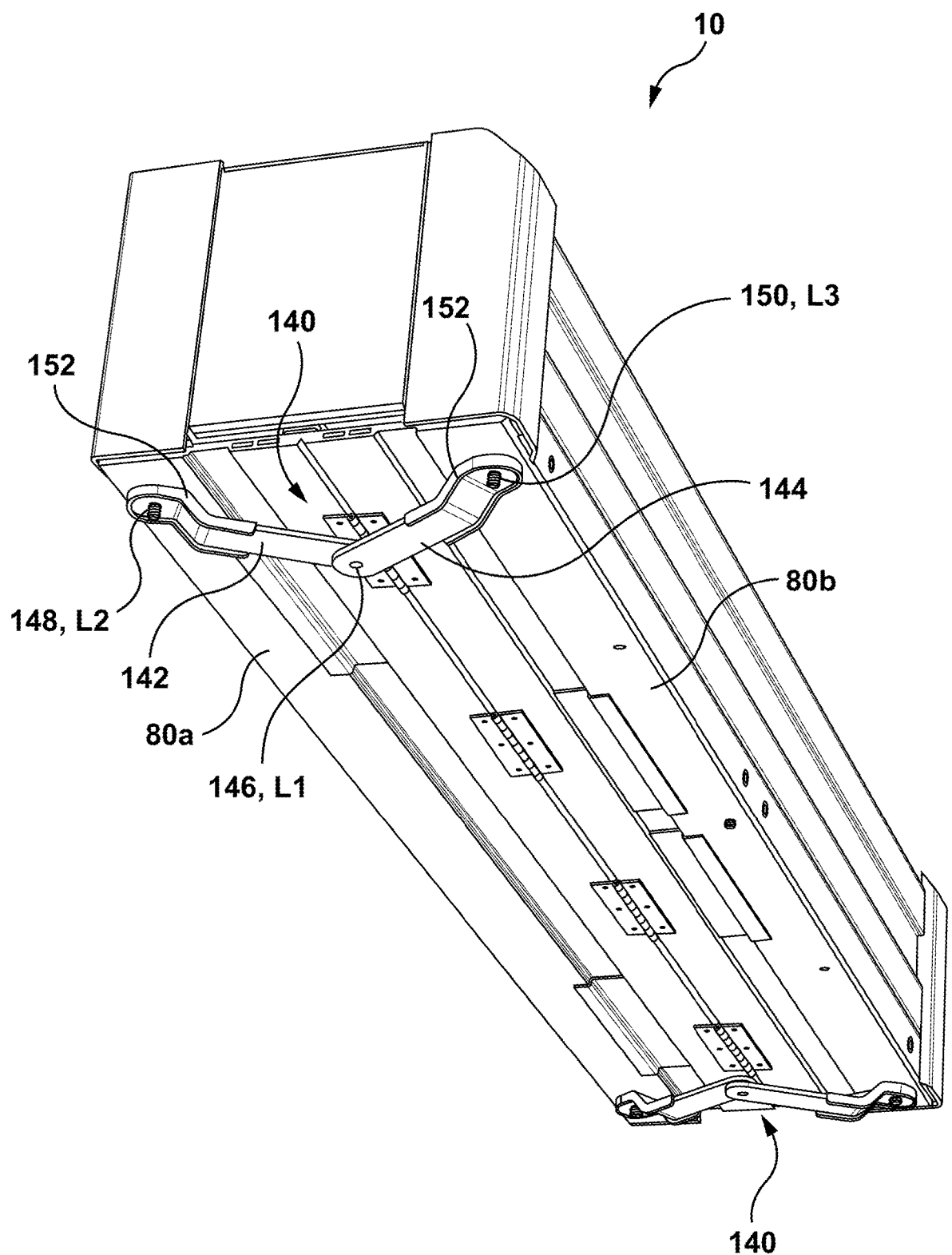
FIG. 11 is a perspective bottom view of the cargo box assembly according to FIG. 3, shown in the deployed state.
Figure 12:
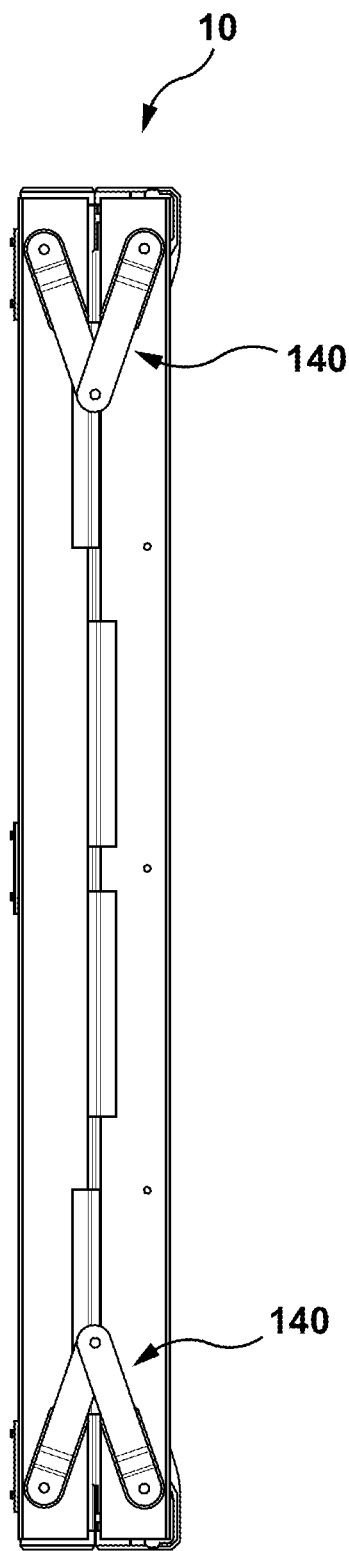
FIGS. 12 and 13 are bottom views of the cargo box assembly according to FIG. 3, showing the cargo box assembly in the collapsed state and deployed state, respectively.
Figure 13:
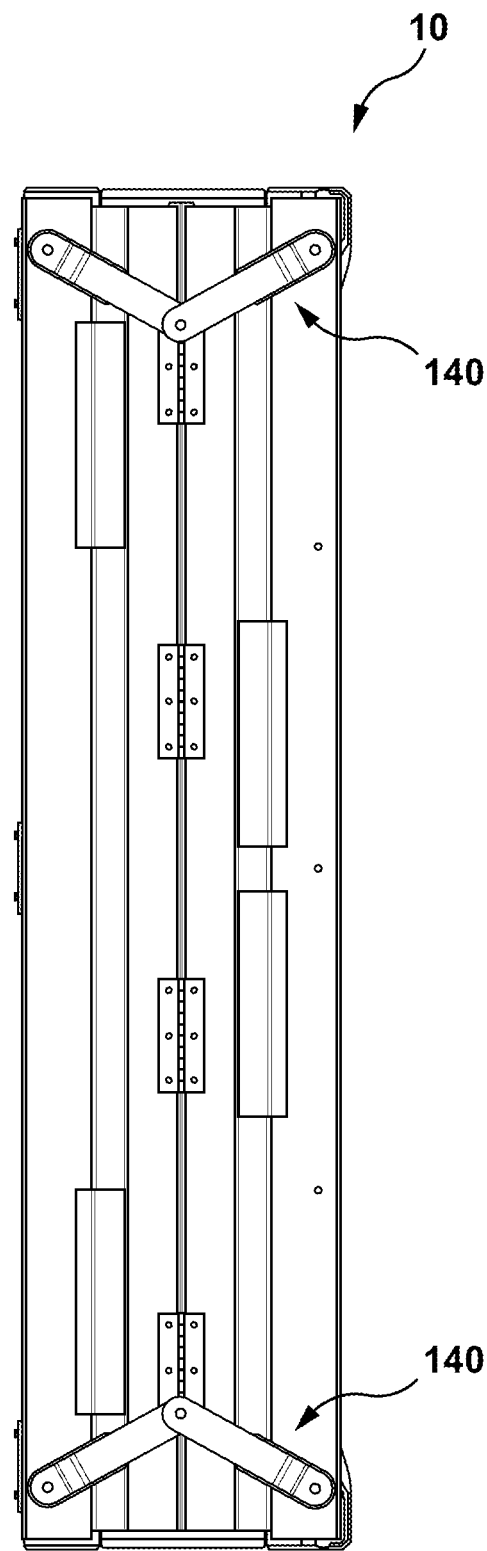

Referring now to FIGS. 11 to 13, on the underside of the cargo box assembly 10, extending from the first floor support bracket 80a to the second floor support bracket 80b is at least one load supporting linkage mechanism 140. The linkage mechanism includes a first linkage arm 142, and a second linkage arm 144, the first and second linkage arms being operably connected at a pivot 146 that defines a first linkage pivot point L1. In turn, the first linkage arm 142 is pivotally attached to the first floor support bracket 80a at a pivot 148 that defines a second linkage pivot point L2; the second linkage arm 144 is pivotally attached to the second floor support bracket 80b at a pivot 150 that defines a third linkage pivot point L3. The linkage mechanism may include structural features 152 (i.e. ribs) to enhance the load capabilities of the linkage arms.

In the embodiment shown, the underside of the cargo box assembly 10 includes two load support linkage mechanism 140. In other embodiments, more than two linkage mechanisms may be implemented, depending on the intended load capacity of the cargo box assembly.

With reference to FIGS. 12 and 13, which show the cargo box assembly 10 from a bottom perspective, the arrangement of the linkage mechanism 140 relative to the cargo box assembly is shown in the collapsed and deployed states, respectively.

The choice of materials for the first and second linkage arms will be based on the intended load bearing performance. Materials may include, but are not limited to metal (i.e. steel, aluminum, etc.), plastic and composites. There is no intention to limit the material for the linkage arms to any particular material, as any suitable material capable of achieving the required load bearing performance may be suitably implemented.

It will be further appreciated that other arrangements for a load supporting mechanism may be implemented, including but not limited to a telescoping load bearing arrangement.

Rolling Lid

Figure 14:
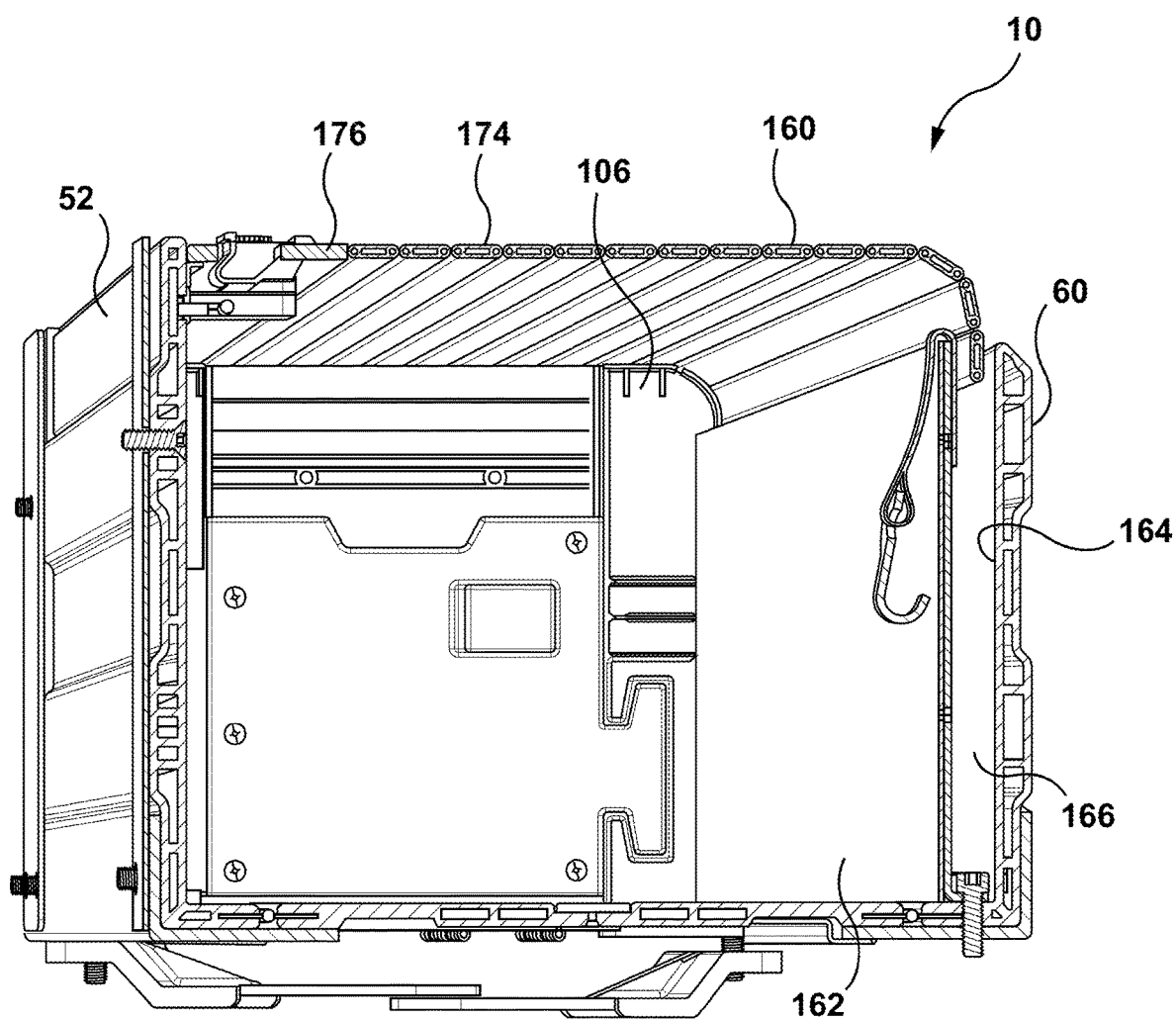
FIGS. 14 and 15 are alternate perspective side views of the cargo box assembly according to FIG. 3, showing various internal and external features of the assembly.
Figure 15:
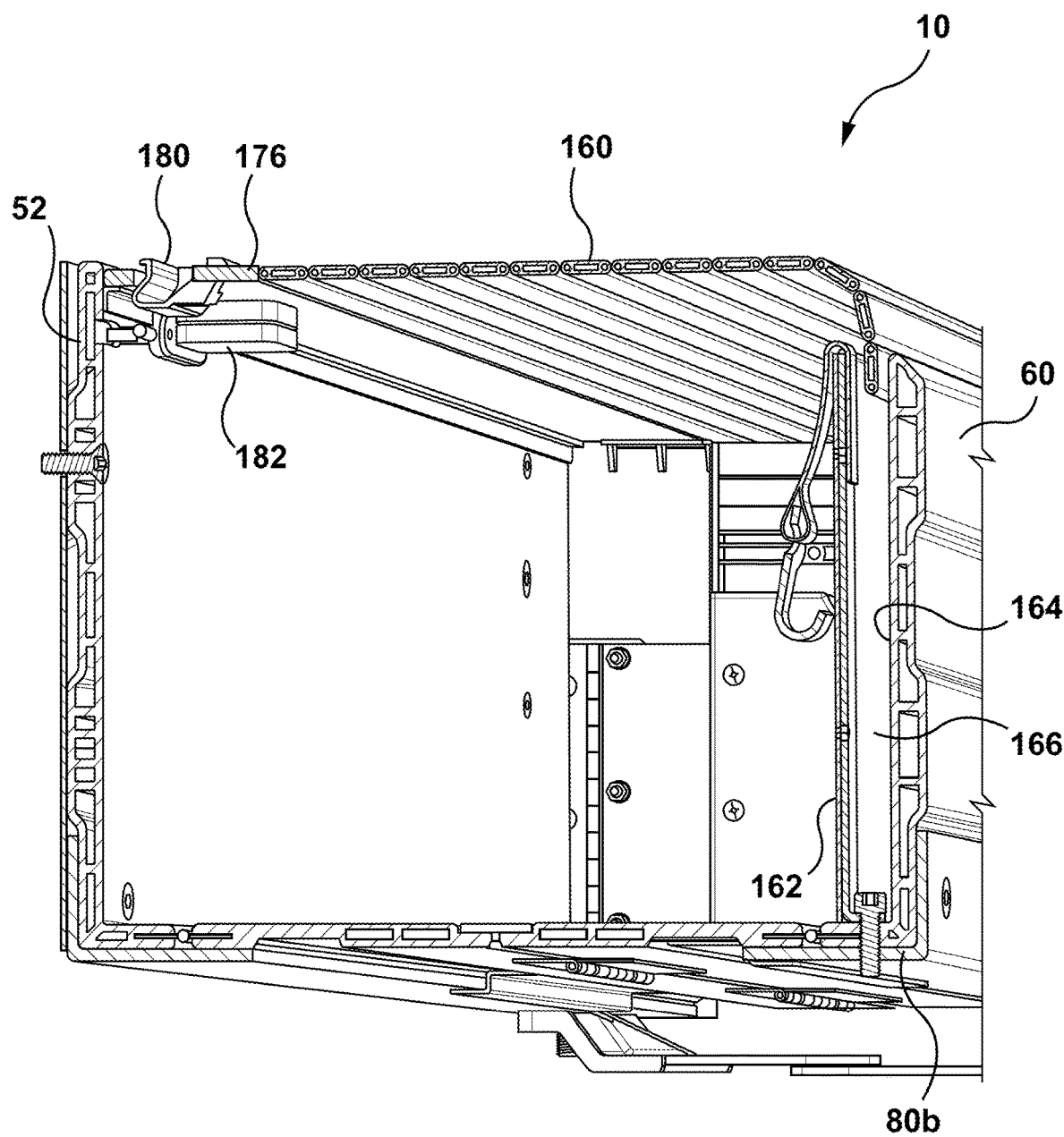

The cargo box assembly 10 includes a lid 160 to ensure contents of the cargo box assembly remain secure. As shown in FIGS. 14 and 15, the lid 160 extends from the inner wall plate 60 to the outer wall plate 52. With reference to FIG. 15, the inner wall plate 60, and in particular the floor support bracket 80*b* supports a lid divider wall 162. The lid divider wall 162 is fixedly attached to the floor support bracket 80*b* in a manner that provides a gap spacing between the lid divider wall 162 and an inside surface 164 of the inner wall plate 60. The gap spacing, herein referred to as a lid pocket 166 is configured to receive the lid 160, for example when the lid 160 is being opened. Movement of the lid 160 through the open and closed positions may be facilitated through a track or similar guide mechanism provided in each of the forward and rearward corner brackets 106, 108. As shown, a guide track 170 is located on the forward corner bracket 106; the rearward corner bracket 108 is similarly configured. In addition, the forward and rearward folding walls 120, 122 include guide tracks 172 on the deployed track panels 132, to support the lid 160 during movement over the forward and rearward folding walls 120, 122.

The lid 160 is shown as a tambour-type door assembly. In this arrangement, the lid is constructed from a plurality of lid slats 174 that are interconnected on the longitudinal edges using a suitable hinge. The hinges may be barrel-type hinges, although flexible hinges are generally preferred for their enhanced ability to seal against the ingress of water and debris. The lid slats 174 may be formed of any suitable material including but not limited to metal (i.e. aluminum), plastics, and composites. The width of each slat 174 is generally chosen to achieve a desired performance/behavior. The lid also includes a widened lid panel portion 176 which is configured to engage the outer wall plate 52 on closure of the lid 160.

The lid 160 is generally tethered or otherwise connected to the floor support bracket 80*b* or a lower region of the inner wall plate 60 using a suitable connector (not shown). While a single connector may be used, a plurality of connectors is generally preferred, with at least one connector positioned towards the forward end 110 of the inner wall plate 60, and one connector positioned towards the rearward end 112 of the inner wall plate 60.

With reference to FIG. 15, the lid 160 may also include on the lid panel portion 176 a handle 180 and/or a lock mechanism 182 to enable the user to securely lock the lid 160 in the closed position. Accordingly, the lock mechanism 182 is configured to engage a lock feature disposed on the outer wall plate 52 such that the lid 160 cannot be opened unless the lock mechanism 182 is purposely disengaged.

Tether System

The cargo box assembly 10 may be constructed to bias the assembly towards the opened position, to facilitate deployment. For example, the hinges used in the floor assembly 64, in particular the first floor hinge(s) 70 interconnecting the first and second floor panels 66, 68 may include springs that bias the hinge(s) to the deployed state. With this arrangement, a mechanism is required to keep the cargo box assembly in the collapsed state when not in use.

Figure 16:
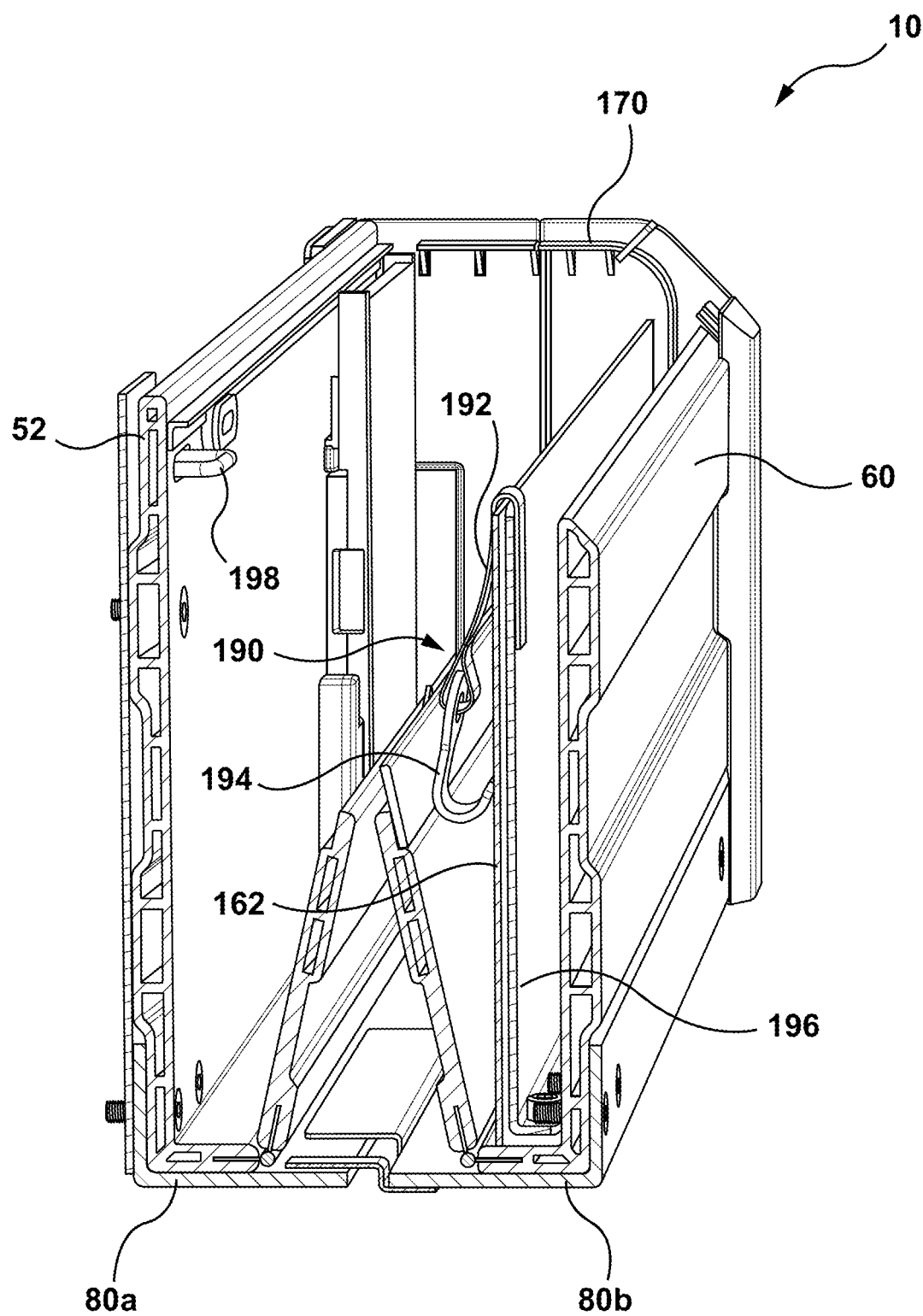
FIG. 16 is a perspective side view of the cargo box assembly according to FIG. 3, showing the cargo box assembly in the collapsed state, and without the lid to permit for viewing portions of the interior space thereof.

With reference to FIG. 16, shown is a partial sectional view of the cargo box assembly 10, showing a tether system 190 designed to keep the cargo box assembly 10 in the collapsed state when not in use. The tether system 190 includes a cable/strap 192 fixedly attached to the lid divider wall 162 and a hook 194. For additional strength, a supplemental bracket 196 may be utilized that directs at least a portion of the load to the inner wall plate 60 and/or floor support bracket 80*b*. Although shown as detached and ready for deployment, the hook 194 is configured to extend across the cargo box assembly towards the outer wall plate 52, and engage an anchor loop 198 fixedly attached thereto. In this way, the inner wall plate 60 cannot extend away from the outer wall plate 52, from the collapsed state to the deployed state. The cable 192 may be unyielding, or may have a degree of stretchability to facilitate attachment/detachment of the tether assembly as required.

Although the tether system 190 is shown as being fixed to the lid divider wall 162, in other states, the cable/strap 192 of the tether system 190 may be fixedly attached at other locations. For example, the cable/strap 192 may be fixedly attached to the second floor panel 68 proximal to the third floor hinge 74. Alternatively, the cable/strap 192 may be fixedly attached to a portion of the inner wall plate 60 and/or the second floor support bracket 80*b*.

Materials

The cargo box assembly, and in particular the components that establish the overall structure of the assembly, for example the base wall and the various wall/panel elements may be manufactured from any suitable plastic material including, but not limited to—

1. Polypropylene (PP)—(glass-filled, or carbon-fiber filled)
2. Nylon/Polyamide (PA) (11, 12, 6, 66)—(glass-filled, or carbon-fiber filled)
3. High-density polyethylene (HDPE)
4. Acrylonitrile butadiene styrene (ABS)
5. Acrylonitrile butadiene styrene/polycarbonate (ABS-PC)
6. ethylene propylene diene monomer (EPDM)
7. polypropylene-ethylene propylene diene monomer (PP-EPDM)
8. TPE (thermoplastic Elastomers) The use of plastics may be further enhanced through the use of fillers, including but not limited to natural fibers, glass fiber, virgin and/or recycled carbon fiber, colors/dyes, as well as fillers that confer UV resistance and/or chemical resistance. The panels could also be constructed out of polyurethane composite board sandwich materials, or other composite materials such as recycled carbon fiber boards. The panels may be formed in a variety of ways including but not limited to injection molding, blow molding, compression molding, extrusion molding, thermoform molding or some combination of the aforementioned processes. The wall panels may also be formed using a suitable additive manufacturing (i.e. 3-D printing) process. It will also be appreciated that the cargo box assembly may be manufactured from a combination of materials.

Mount

The cargo box assembly 10 may be mounted within the cargo bed 24 in a variety of ways. For example, in one mounting embodiment, the cargo box assembly 10 may be mounted directly to the sheet metal defining the side wall section (30*a*, 30*b*). In this way, suitable hardware would be used to anchor the base member 50 directly upon the side wall section 32, for example through the use of threaded fasteners.

Figure 17:
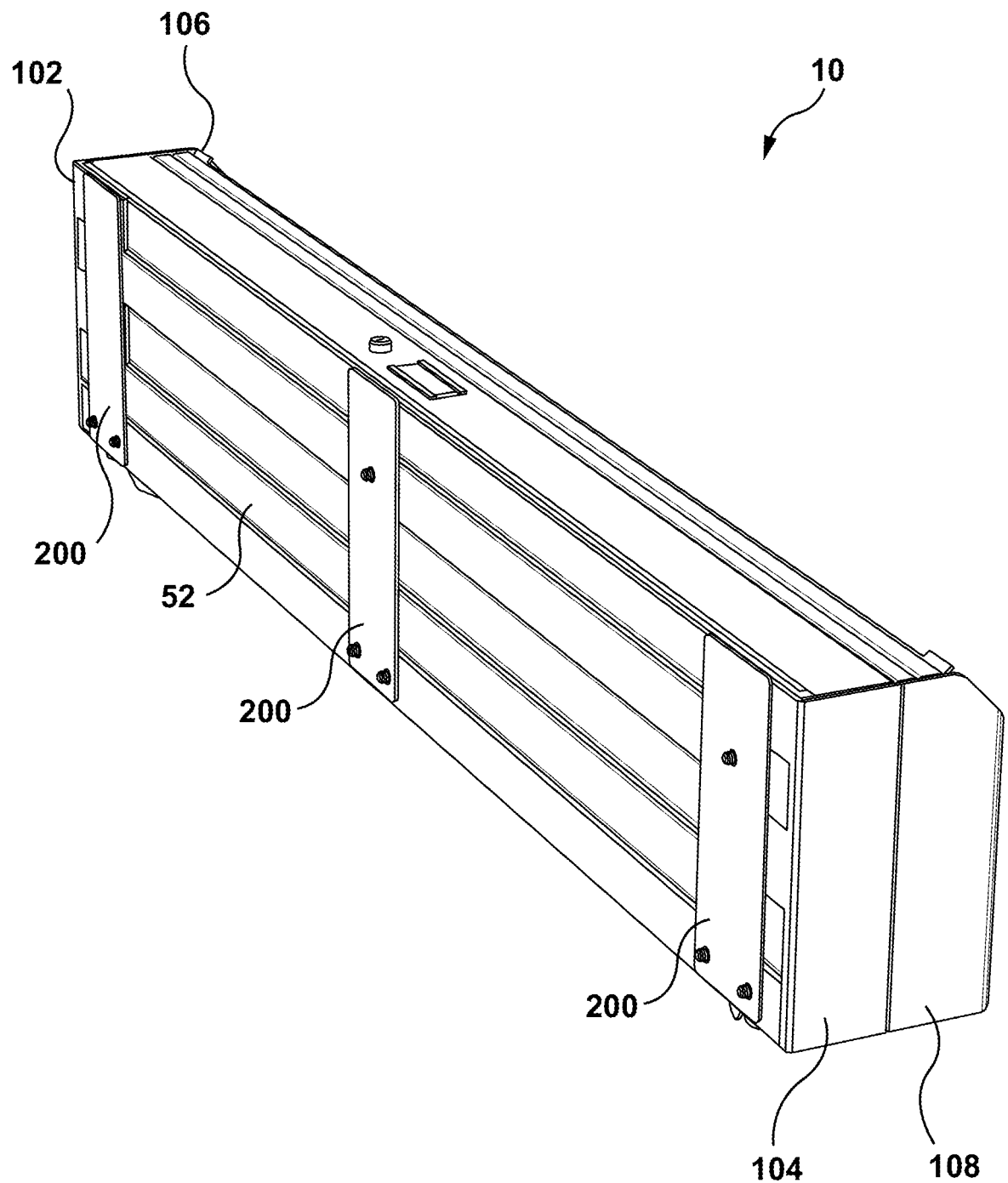
FIG. 17 is a perspective outboard side view of the cargo box assembly according to FIG. 3, showing the cargo box assembly in the collapsed state.

In another mounting embodiment, the cargo box assembly 10 is mounted within the cargo bed 24 using a clamping system configured to engage the sheet metal lip defining the bed rail 42. The clamping system would be mounted on the base member 50, and would include a plurality of clamps having a suitable tightening means to ensure secure anchorage of the cargo box assembly 10 to the bed rail 42. Clamps can be distributed at intervals along the length of the cargo bed, to allow for multiple mounting points. The clamps could be positioned along the length of the side wall either independently, or collectively through use of a cross member that defines the fixed relative positions of the clamps with respect to each other. The clamps would be made of a strong material, such as steel, stainless steel, or aluminum, or engineered plastics and elastomeric materials, or a combination of these. The base member 50 of the cargo box assembly 10 may additionally include a reinforcement member 200 (see FIG. 17) at each location where a chosen mounting element attaches to the base member 50.

In other mounting embodiments a 'press-fit' installation may be used. For example, in some embodiments, the base member 50 may have associated therewith a telescoping fixture that permits it to be securely mounted between the cargo floor 26 and the underside of the bed rail 42, without the use of fasteners and the requirement to drill holes in the cargo bed. The telescoping fixture may be spring actuated, or otherwise configured to establish a frictional fit between the upper and lower ends of the telescoping fixture and the corresponding receiving surfaces, namely the underside of the bed rail and the cargo bed, therein retaining the base in position.

The cargo box assembly may additionally include one or more rigid, flexible, sprung and/or un-sprung members ("support-frame") to provide additional supporting structure. In some instances, the additional supporting members will extend from an upper anchorage point (i.e. an upper anchor point on the outer wall plate 52) diagonally down to the floor support bracket 80*b* on the inner wall plate 60. Alternatively, the additional supporting members may extend from below the cargo box assembly, for example from the floor support bracket 80*b* on the inner wall plate 60 to the bed floor 26, or to the side wall portion 32, or the corner defined therebetween. In yet another alternative arrangement, the additional supporting members may extend from the sides of the cargo box assembly. Regardless of the arrangement, the use of additional supporting members is intended to provide additional stability, vibration/noise dampening, load-bearing, structural rigidity and/or other performance enhancements, as required. Additional supporting members may be made of steel, stainless steel, aluminum, or engineered plastics and/or elastomeric materials.

Deployment

The collapsed state of the cargo box assembly 10 is shown in FIG. 18. For a user to expand the cargo box assembly 10 to the expanded deployed state (as shown in FIG. 19), the following steps are followed.

Step 1—The first step in the deployment of the cargo box assembly 10 is to unlock/unlatch the lid 160 from the outer wall plate 52. Once unlocked/unlatched, the lid 160 is disengaged from the outer wall plate 52, allowing the lid 160 to move with the inner wall plate 60. To facilitate disengagement of the lid 160 from the outer wall plate 52, the user may pull upon the handle 180.

Step 2—The second step in the deployment of the cargo box assembly is to rotate the lid panel portion 176 upwards to expose the tether system 190. The user reaches through the opening exposed by the opened lid panel portion 176 and unhooks the tether hook 194 from the anchor loop 198. In this way, the inner wall plate 60 is free to move inboardly relative to the outer wall plate 52.

Step 3—Under the biasing action provided by the floor hinges 70, the inner wall plate 60 is permitted to extend inboard (relative to the cargo bed) to the expanded position.

Step 4—With the inner wall plate 60 positioned at the deployed position, the forward and rearward folding walls are rotated into position, engaging the interlock pin 126 of each folding wall into the respective recess 128 formed in the corner brackets.

Step 5—The cargo box is now ready for use. It can be loaded, or if the lid is to be closed, it can be pulled by way of the handle 180 until the lid 160 engages the outer wall plate 52. If necessary, it can be latched/locked into the closed position using the lock mechanism 182.

While various embodiments according to the present invention have been described above, it should be understood that they have been presented by way of illustration and example only, and not limitation. It will be apparent to persons skilled in the relevant art that various changes in form and detail can be made therein without departing from the scope of the invention. Thus, the breadth and scope of the present invention should not be limited by any of the above-described exemplary embodiments, but should be defined only in accordance with the appended claims and their equivalents. It will also be understood that each feature of each embodiment discussed herein, and of each reference cited herein, can be used in combination with the features of any other combination. All patents and publications discussed herein are incorporated by reference herein in their entirety.

What is claimed is:

1. An expandable cargo box assembly for mounting on a side wall section of a cargo bed of a pickup truck, the expandable cargo box assembly comprising:

a base member for attaching the expandable cargo box assembly to the side wall section of the cargo bed, the base member having the form of an outer wall plate;

an inner wall plate positioned opposite to the outer wall plate, the inner wall plate being displaceable from a first position to a second position, the first position defining a collapsed state of the expandable cargo box assembly, and the second position defining a deployed state of the expandable cargo box assembly; and a folding floor assembly operably coupled between the outer wall plate and the inner wall plate, wherein the outer wall plate supports a forward folding wall and a rearward folding wall, and wherein upon opening the expandable cargo box assembly to the deployed state, the folding floor assembly and the forward and rearward folding walls are arranged to define an enclosure for receiving cargo, and wherein the folding floor assembly includes a first floor panel and a second floor panel, the first and second floor panels being hingedly connected together by a first floor hinge, and wherein the first floor panel on a side opposite the first floor hinge is hingedly connected to a lower longitudinal edge of the outer wall plate, while the second floor panel on a side opposite the first floor hinge is hingedly connected to a lower longitudinal edge of the inner wall plate.

2. The expandable cargo box assembly according to claim 1, wherein the inner wall plate and the outer wall plate each include a respective floor support bracket dimensioned to extend along at least a portion of the respective wall plate, a first floor support bracket being positioned to support a portion of the first floor panel proximal the hinged connection between the first floor panel and the outer wall plate, and the second floor support bracket being positioned to support a portion of the second floor panel proximal to the hinged connection between the second floor panel and the inner wall plate.

3. The expandable cargo box assembly according to claim 2, wherein the first and second floor support brackets include at least one bracket extender to provide additional support to an underside of the respective floor panel.

4. The expandable cargo box assembly according to claim 2, wherein at least one load supporting linkage mechanism is provided on an underside of the cargo box assembly, the load supporting linkage mechanism includes a first linkage arm pivotally attached to the first floor support bracket and a second linkage arm pivotally attached to the second floor support bracket, the first and second linkage arms being pivotally connected therebetween.

5. The expandable cargo box assembly according to claim 1, wherein the cargo box assembly additionally includes a lid.

6. The expandable cargo box assembly according to claim 5, wherein the lid is in the form of a tambour-type door assembly, with a plurality of interconnected lid slats.

7. The expandable cargo box assembly according to claim 5, wherein the lid is movable and extendable from a lid pocket defined between a lid divider wall and the inner wall plate, the lid being movable towards the outer wall plate to achieve closure of the cargo box assembly.

8. The expandable cargo box assembly according to claim 5, wherein the lid is tethered to the floor support bracket or a lower region of the inner wall plate.

9. An expandable cargo box assembly for mounting on a side wall section of a cargo bed of a pickup truck, the expandable cargo box assembly comprising:

a base member for attaching the expandable cargo box assembly to the side wall section of the cargo bed, the base member having the form of an outer wall plate;

an inner wall plate positioned opposite to the outer wall plate, the inner wall plate being displaceable from a first position to a second position, the first position defining a collapsed state of the expandable cargo box assembly, and the second position defining a deployed state of the expandable cargo box assembly; and a folding floor assembly operably coupled between the outer wall plate and the inner wall plate, wherein the outer wall plate supports a forward folding wall and a rearward folding wall, and wherein upon opening the expandable cargo box assembly to the deployed state, the folding floor assembly and the forward and rearward folding walls are arranged to define an enclosure for receiving cargo, and wherein the outer wall plate includes a forward corner bracket at a forward end, and a rearward corner bracket at a rearward end, and wherein the inner wall plate includes a forward corner bracket at a forward end and a rearward corner bracket at a rearward end.

10. The expandable cargo box assembly according to claim 9, wherein the forward corner bracket of the outer wall plate hingedly supports the forward folding wall, and wherein the rearward corner bracket of the outer wall plate hingedly supports the rearward folding wall.

11. The expandable cargo box assembly according to claim 10, wherein on rotation of the forward folding wall from the collapsed state to the deployed state, the forward folding wall interlocks with the forward corner bracket of the inner wall plate, and wherein on rotation of the rearward folding wall from the collapsed state to the deployed state, the rearward folding wall interlocks with the rearward corner bracket of the inner wall plate.

12. The expandable cargo box assembly according to claim 11, wherein the forward and rearward folding walls interlock with respective forward and rearward corner brackets of the inner wall plate by way of an integral interlock pin formed on the respective folding wall, the interlock pin being received in a complementary shaped recess formed on the respective forward and rearward corner brackets of the inner wall plate.

13. The expandable cargo box assembly according to claim 9, wherein the cargo box assembly additionally includes a lid.

14. The expandable cargo box assembly according to claim 13, wherein the lid is in the form of a tambour-type door assembly, with a plurality of interconnected lid slats.

15. The expandable cargo box assembly according to claim 13, wherein the lid is movable and extendable from a lid pocket defined between a lid divider wall and the inner wall plate, the lid being movable towards the outer wall plate to achieve closure of the cargo box assembly.

16. The expandable cargo box assembly according to claim 13, wherein the lid is tethered to the floor support bracket or a lower region of the inner wall plate.

17. An expandable cargo box assembly for mounting on a side wall section of a cargo bed of a pickup truck, the expandable cargo box assembly comprising:

a base member for attaching the expandable cargo box assembly to the side wall section of the cargo bed, the base member having the form of an outer wall plate;

an inner wall plate positioned opposite to the outer wall plate, the inner wall plate being displaceable from a first position to a second position, the first position defining a collapsed state of the expandable cargo box assembly, and the second position defining a deployed state of the expandable cargo box assembly; and a folding floor assembly operably coupled between the outer wall plate and the inner wall plate, wherein the outer wall plate supports a forward folding wall and a rearward folding wall, and wherein upon opening the expandable cargo box assembly to the deployed state, the folding floor assembly and the forward and rearward folding walls are arranged to define an enclosure for receiving cargo, and wherein each of the forward and rearward folding walls include a track panel hingedly connected to the respective folding wall, the track panel being positionable from a downward stowed position, to an upward deployed position, the track panel providing guide tracks to facilitate movement of a closure lid.

18. The expandable cargo box assembly according to claim 17, wherein the cargo box assembly additionally includes a lid and the lid is in the form of a tambour-type door assembly, with a plurality of interconnected lid slats.

19. The expandable cargo box assembly according to claim 17, wherein the cargo box assembly additionally includes a lid and the lid is movable and extendable from a lid pocket defined between a lid divider wall and the inner wall plate, the lid being movable towards the outer wall plate to achieve closure of the cargo box assembly.

20. The expandable cargo box assembly according to claim 17, wherein the cargo box assembly additionally includes a lid and the lid is tethered to the floor support bracket or a lower region of the inner wall plate.

\* \* \* \* \*